US012670680B2

(12) United States Patent
Lutter et al.

(10) Patent No.: US 12,670,680 B2
(45) Date of Patent: Jun. 30, 2026

(54) SYSTEMS AND METHODS FOR CORRELATION BETWEEN ROTATION OF A THREE-DIMENSIONAL OBJECT AND ROTATION OF A VIEWPOINT OF A USER

(71) Applicant: Apple Inc., Cupertino, CA (US)

(72) Inventors: Gregory Lutter, Boulder Creek, CA (US); Manuel C. Clement, Felton, CA (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 18/523,024

(22) Filed: Nov. 29, 2023

(65) Prior Publication Data

US 2024/0193892 A1     Jun. 13, 2024

Related U.S. Application Data

(60) Provisional application No. 63/386,873, filed on Dec. 9, 2022.

(51) Int. Cl.
*G06T 19/20*          (2011.01)

(52) U.S. Cl.
CPC ...... *G06T 19/20* (2013.01); *G06T 2219/2016* (2013.01)

(58) Field of Classification Search
None
See application file for complete search history.

(56) References Cited

U.S. PATENT DOCUMENTS

| | | |
|---|---|---|
| 10,289,207 B1 | 5/2019 | Sainty |
| 10,901,505 B1 | 1/2021 | Haine et al. |
| 10,993,612 B1 | 5/2021 | Abou Shousha et al. |
| 11,094,106 B2 | 8/2021 | Tamaoki et al. |
| 11,651,563 B1 | 5/2023 | Arsan et al. |
| 2013/0241925 A1 | 9/2013 | Kawana et al. |
| 2013/0336629 A1 | 12/2013 | Mulholland et al. |
| 2014/0267419 A1 | 9/2014 | Ballard et al. |

(Continued)

OTHER PUBLICATIONS

McHugh, "Head-Tracked Transformations", Aug. 18, 2016, Medium. com, 'https://medium.com/humane-virtuality/head-tracked-transformations-e7102d3c9789' (Year: 2016).*

(Continued)

*Primary Examiner* — Kent W Chang
*Assistant Examiner* — Jonathan M Cofino
(74) *Attorney, Agent, or Firm* — Kubota & Basol LLP

(57) ABSTRACT

In some examples, an electronic device presents a computer-generated environment that includes an object. In some examples, while presenting the computer-generated environment, the electronic device detects an input that includes rotation of a viewpoint of a user of the electronic device relative to the computer-generated environment. In response to detecting the input, in accordance with a determination that the rotation of the viewpoint is in a first direction, the electronic device rotates the object in a first respective direction, based on the first direction, relative to the viewpoint. In accordance with a determination that the rotation of the viewpoint is in a second direction the electronic device rotates the object in a second respective direction, based on the second direction, relative to the viewpoint.

24 Claims, 21 Drawing Sheets

500

Present, via a display, a computer-generated environment including a first object, wherein the first object is a virtual object within the computer-generated environment
502

While presenting the computer-generated environment that includes the first object, detect, via one or more input devices, a first input that includes rotation of a viewpoint of a user of the electronic device
504

In response to detecting the first input:
506 in accordance with a determination that the rotation of the viewpoint of the user is in a first direction, rotate, via the display, the first object in a first respective direction, based on the first direction, in the computer-generated environment relative to the viewpoint
508 in accordance with a determination that the rotation of the viewpoint of the user is in a second direction, different from the first direction, rotate the first object in a second respective direction, different from the first respective direction, based on the second direction, in the computer-generated environment relative to the viewpoint
510

(56) References Cited

U.S. PATENT DOCUMENTS

| | | | |
|---|---|---|---|
| 2014/0347390 A1* | 11/2014 | Poulos | G06F 3/011 |
| | | | 345/633 |
| 2016/0026242 A1 | 1/2016 | Burns et al. | |
| 2017/0046881 A1 | 2/2017 | Kuribara | |
| 2017/0052595 A1* | 2/2017 | Poulos | G06F 3/04847 |
| 2017/0329480 A1 | 11/2017 | Ishikawa et al. | |
| 2018/0143693 A1 | 5/2018 | Calabrese et al. | |
| 2019/0088020 A1 | 3/2019 | Fukazawa et al. | |
| 2019/0158818 A1 | 5/2019 | Ho et al. | |
| 2019/0244416 A1 | 8/2019 | Tamaoki et al. | |
| 2020/0051304 A1 | 2/2020 | Choi et al. | |
| 2020/0218072 A1 | 7/2020 | Inatani et al. | |
| 2020/0233487 A1 | 7/2020 | Grzesiak | |
| 2020/0286299 A1* | 9/2020 | Wang | G06F 3/04815 |
| 2020/0365117 A1 | 11/2020 | Dumas et al. | |
| 2021/0239988 A1 | 8/2021 | Kobayashi | |
| 2022/0139041 A1 | 5/2022 | Li et al. | |
| 2022/0291744 A1 | 9/2022 | Sugihara et al. | |
| 2023/0005098 A1 | 1/2023 | Aoki et al. | |
| 2023/0236674 A1 | 7/2023 | Morikawa et al. | |
| 2023/0343028 A1 | 10/2023 | Nair et al. | |
| 2024/0192772 A1 | 6/2024 | Lutter et al. | |
| 2024/0192773 A1 | 6/2024 | Lutter et al. | |
| 2024/0212268 A1 | 6/2024 | Meno | |

OTHER PUBLICATIONS

Non-Final Office Action received for U.S. Appl. No. 18/527,007, mailed on Feb. 18, 2025, 13 pages.

"How can I get a 3d object to always face player/camera?", Unreal Engine Forums, Epic Games, Inc., May 2014 [online]. Retrieved from <https://forums.unrealengine.com/t/how-can-i-get-a-3d-object-to-always-face-player-camera/282682>, [retrieved on Mar. 31, 2025], 6 pages.

"Rotate object to look at camera using Realitykit Look(at) is broken", Apple Developer Forums, Apple Inc., Aug. 2020 [online]. Retrieved from <https://developer.apple.com/forums/thread/656611>, [retrieved on Mar. 10, 2025], 3 pages.

Final Office Action received for U.S. Appl. No. 18/527,007, mailed on May 23, 2025, 21 pages.

Non-Final Office Action received for U.S. Appl. No. 18/527,007, mailed on Sep. 8, 2025, 21 pages.

Non-Final Office Action received for U.S. Appl. No. 18/522,953, mailed on Apr. 2, 2025, 33 pages.

Final Office Action received for U.S. Appl. No. 18/522,953, mailed on Jul. 16, 2025, 37 pages.

Non-Final Office Action received for U.S. Appl. No. 18/522,953, mailed on Dec. 11, 2025, 30 pages.

Notice of Allowance received for U.S. Appl. No. 18/527,007, mailed on Feb. 10, 2026, 8 pages.

Notice of Allowance received for U.S. Appl. No. 18/522,953, mailed on Mar. 5, 2026, 12 pages.

* cited by examiner

Device
201

401

409'          450

412          408

404

410

Sculpture A

471A

Viewpoint
418

Rotation
Magnitude
451

Sculpture A

471B

Viewpoint
418

Rotation
Magnitude
451

Sculpture A

471C

Viewpoint
418

Rotation
Magnitude
451

0

401

450

409'

485

472D

412

408

404

410

Sculpture A

471D

Viewpoint
418

Rotation
Magnitude
451

0

401

409'    450

485

412    472E

408

404

410

Sculpture A

Viewpoint
418

Rotation
Magnitude
451

0

401

450

409'

412

408

404

410

Sculpture A

471F 1     2

Viewpoint
418

Rotation
Magnitude
— 451

0

Amount 1
452-1

401

450

409'

485

472G

412

408

404

410

Sculpture A

471G

①　　②

Viewpoint
418

Rotation
Magnitude
451

0

Amount 1
452-1

401

409'

450

485

472H

412

408

404

410

Sculpture A

Viewpoint
418

Rotation
Magnitude
451

0

Amount 2
452-2

SYSTEMS AND METHODS FOR CORRELATION BETWEEN ROTATION OF A THREE-DIMENSIONAL OBJECT AND ROTATION OF A VIEWPOINT OF A USER

CROSS-REFERENCE TO RELATED APPLICATIONS

This application claims benefit of U.S. Provisional Application No. 63/386,873, filed Dec. 9, 2022, the entire disclosure of which is herein incorporated by reference for all purposes.

FIELD OF THE DISCLOSURE

This relates generally to systems and methods for correlating rotation of a three-dimensional object in a three-dimensional environment to rotation of a viewpoint of a user.

BACKGROUND OF THE DISCLOSURE

Some computer graphical environments provide two-dimensional and/or three-dimensional environments where at least some objects displayed for a user's viewing are virtual and generated by a computer. In some examples, the objects are displayed in the three-dimensional environments with particular orientations (e.g., relative to a viewpoint of a user of the computer). In some examples, an object moves in the three-dimensional environment based on a movement of the viewpoint of the user (e.g., movement of the user's head and/or torso). In some examples, an undesired or unintended view of the object is presented to the user in the three-dimensional environment after the movement of the viewpoint of the user based on the particular orientation in which the object is displayed in the three-dimensional environment.

SUMMARY OF THE DISCLOSURE

Some examples of the disclosure are directed to systems and methods for correlating rotation of a three-dimensional object to rotation of a viewpoint of a user. In some examples, an electronic device presents a computer-generated three-dimensional environment that includes a virtual object. In some examples, while presenting the computer-generated environment that includes the virtual object, the electronic device detects a first input that includes rotation of a viewpoint of a user of the electronic device relative to the computer-generated environment. In some examples, in response to detecting the first input, in accordance with a determination that the rotation of the viewpoint is in a first direction, the electronic device rotates the virtual object in a first respective direction, based on the first direction, in the computer-generated environment relative to the viewpoint. In some examples, in accordance with a determination that the rotation of the viewpoint is in a second direction, different from the first direction, the electronic device rotates the virtual object in a second respective direction, different from the first respective direction, based on the second direction, in the computer-generated environment relative to the viewpoint.

In some examples, the rotation of the virtual object in the computer-generated environment is about a vertical axis through the virtual object. In some examples, the direction of the rotation of the virtual object in the computer-generated environment is opposite the direction of rotation of the viewpoint of the user. In some examples, an amount of rotation of the virtual object in the computer-generated environment is correlated to an amount of rotation of the viewpoint using a correlation ratio. In some examples, the electronic device rotates the virtual object in the computer-generated environment by a predetermined amount. In some examples, the virtual object is associated with a plurality of predetermined viewing points in the computer-generated environment, and the rotation of the virtual object transitions the display of the virtual object from a first predetermined viewing point to a second predetermined viewing point.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
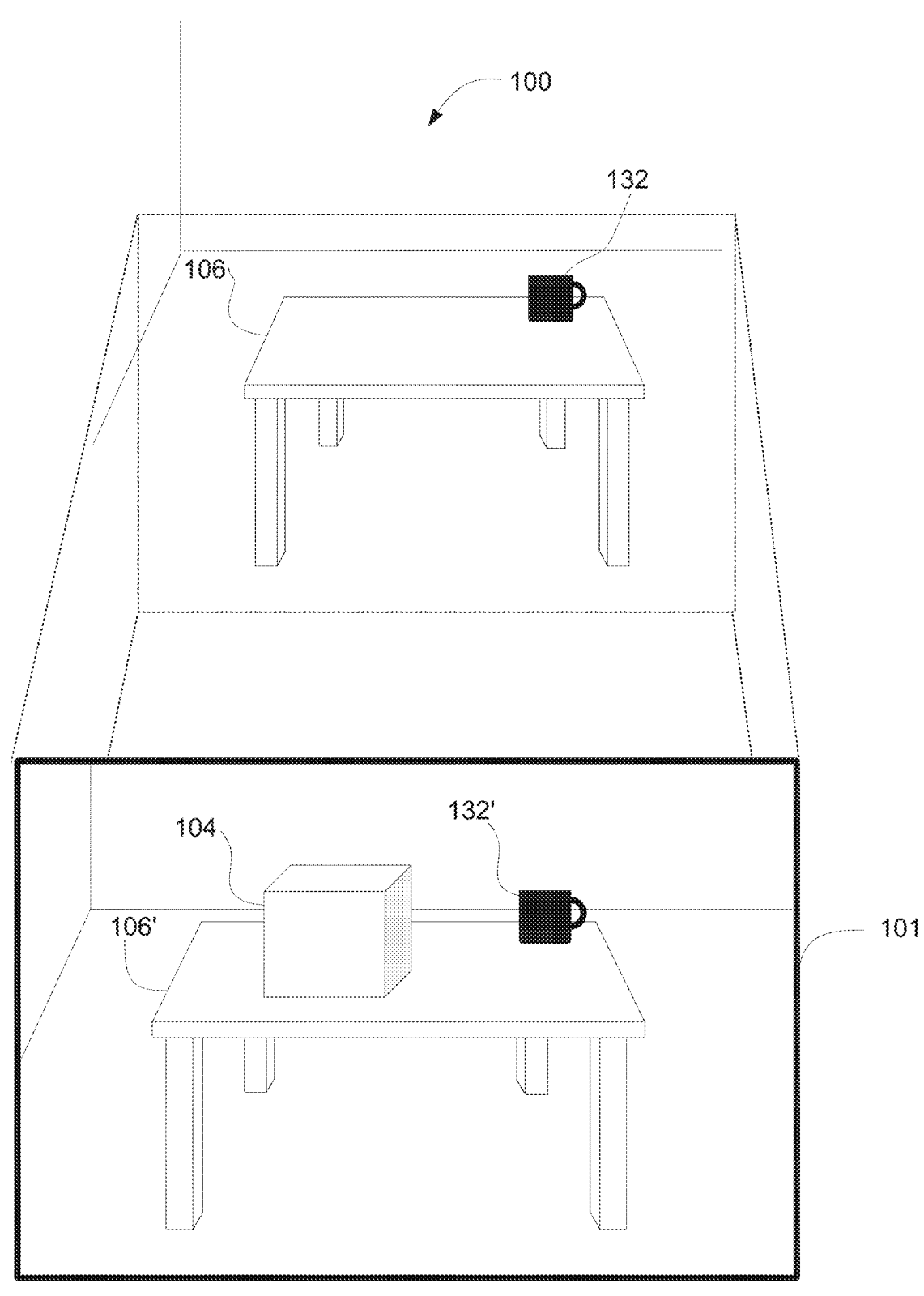
FIG. 1 illustrates an electronic device presenting an extended reality environment according to some examples of the disclosure.

Some examples of the disclosure are directed to systems and methods for correlating rotation of a three-dimensional object to rotation of a viewpoint of a user. In some examples, an electronic device presents a computer-generated three-dimensional environment that includes a virtual object. In some examples, while presenting the computer-generated environment that includes the virtual object, the electronic device detects a first input that includes rotation of a viewpoint of a user of the electronic device relative to the computer-generated environment. In some examples, in response to detecting the first input, in accordance with a determination that the rotation of the viewpoint is in a first direction, the electronic device rotates the virtual object in a first respective direction, based on the first direction, in the computer-generated environment relative to the viewpoint. In some examples, in accordance with a determination that the rotation of the viewpoint is in a second direction, different from the first direction, the electronic device rotates the virtual object in a second respective direction, different from the first respective direction, based on the second direction, in the computer-generated environment relative to the viewpoint.

In some examples, the rotation of the virtual object in the computer-generated environment is about a vertical axis through the virtual object. In some examples, the direction of the rotation of the virtual object in the computer-generated environment is opposite the direction of rotation of the viewpoint of the user. In some examples, an amount of rotation of the virtual object in the computer-generated environment is correlated to an amount of rotation of the viewpoint using a correlation ratio. In some examples, the electronic device rotates the virtual object in the computer-generated environment by a predetermined amount. In some examples, the virtual object is associated with a plurality of predetermined viewing points in the computer-generated environment, and the rotation of the virtual object transitions the display of the virtual object from a first predetermined viewing point to a second predetermined viewing point.

In some examples, displaying an object in a three-dimensional environment with a particular orientation may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In some examples, a three-dimensional object is displayed in a computer-generated three-dimensional environment with a particular orientation that controls one or more behaviors of the three-dimensional object (e.g., how the three-dimensional object is positioned within the three-dimensional environment). In some examples, the orientation in which the three-dimensional object is displayed in the three-dimensional environment is selected by a user of the electronic device or automatically selected by the electronic device. For example, when initiating presentation of the three-dimensional object in the three-dimensional environment, the user may select a particular orientation for the three-dimensional object or the electronic device may automatically select the orientation for the three-dimensional object (e.g., based on a type of the three-dimensional object). In some examples, a three-dimensional object can be displayed in the three-dimensional environment in a world locked orientation, a body locked orientation, a tilt locked orientation, or a head locked orientation, as described below.

As used herein, an object that is displayed in a body locked orientation in a three-dimensional environment has a distance and orientation offset relative to a portion of the user's body (e.g., the user's torso). For example, if the user rotates their torso (irrespective of any head rotation) in the yaw direction, the body locked object would follow the torso rotation and be repositioned within the three-dimensional environment such that it is the same distance and orientation offset relative to the user's torso as before the torso rotation. Alternatively, in some examples, body locked object has a fixed distance from the user without the orientation of the content being referenced to any portion of the user's body. For example, the body locked object would not reposition itself in accordance with the torso rotation in the yaw direction (e.g., the body locked object would remain the same distance offset relative to the user's torso but would not be repositioned to have the same orientation offset relative to the user's torso). Additionally or alternatively, in some examples, the body locked object may be configured to always remain gravity or horizon (e.g., normal to gravity) aligned, such that head and/or body changes in the roll direction would not cause the body locked object to move within the three-dimensional environment. Rather, translational movement in either configuration would cause the body locked object to be repositioned within the three-dimensional environment to maintain the distance offset.

As used herein, an object that is displayed in a head locked orientation in a three-dimensional environment has a distance and orientation offset relative to the user's head. In some examples, a head locked object moves within the three-dimensional environment as the user's head moves (as the viewpoint of the user changes). For example, if the user rotates their head (e.g., clockwise or counterclockwise) in the yaw direction, the head locked object would follow the head rotation and be repositioned within the three-dimensional environment such that it is the same distance and orientation offset relative to the user's head as before the head rotation.

As used herein, an object that is displayed in a world locked orientation in a three-dimensional environment does not have a distance or orientation offset relative to the user. For example, a world locked object remains displayed at the same location in the three-dimensional environment and with the same orientation irrespective of any movement of the user's head and/or torso (e.g., in the yaw, roll, and/or pitch directions).

As used herein, an object that is displayed in a tilt locked orientation in a three-dimensional environment (referred to herein as a tilt locked object) has a distance offset relative to the user, such as a portion of the user's body (e.g., the user's torso) or the user's head. In some examples, a tilt locked object is displayed at a fixed orientation relative to the three-dimensional environment. In some examples, a tilt locked object moves according to a polar (e.g., spherical) coordinate system centered at a pole through the user (e.g., the user's head). For example, the tilt locked object is moved in the three-dimensional environment based on movement of the user's head within a spherical space surrounding (e.g., centered at) the user's head. Accordingly, if the user tilts their head (e.g., upward or downward in the pitch direction) relative to gravity, the tilt locked object would follow the head tilt and move radially along a sphere, such that the tilt locked object is repositioned within the three-dimensional environment to be the same distance offset relative to the user as before the head tilt while optionally maintaining the same orientation relative to the three-dimensional environment. In some examples, if the user moves their head in the roll direction (e.g., clockwise or counterclockwise) relative to gravity, the tilt locked object is not repositioned within the three-dimensional environment.

FIG. 1 illustrates an electronic device 101 presenting an extended reality (XR) environment (e.g., a computer-generated environment) according to some examples of the disclosure. In some examples, electronic device 101 is a hand-held or mobile device, such as a tablet computer, laptop computer, smartphone, or head-mounted display. Examples of device 101 are described below with reference to the architecture block diagram of FIG. 2. As shown in FIG. 1, electronic device 101, table 106, and coffee mug 132 are located in the physical environment 100. The physical environment may include physical features such as a physical surface (e.g., floor, walls) or a physical object (e.g., table, lamp, etc.). In some examples, electronic device 101 may be configured to capture images of physical environment 100 including table 106 and coffee mug 132 (illustrated in the field of view of electronic device 101). In some examples, in response to a trigger, the electronic device 101 may be configured to display a virtual object 104 (e.g., two-dimensional virtual content) in the computer-generated environment (e.g., represented by a cube illustrated in FIG. 1) that is not present in the physical environment 100, but is displayed in the computer-generated environment positioned on (e.g., anchored to) the top of a computer-generated representation 106' of real-world table 106. For example, virtual object 104 can be displayed on the surface of the computer-generated representation 106' of the table in the computer-generated environment next to the computer-generated representation 132' of real-world coffee mug 132 displayed via electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional computer-generated environment. For example, the virtual object can represent an application or a user interface displayed in the computer-generated environment. In some examples, the virtual object can represent content corresponding to the application and/or displayed via the user interface in the computer-generated environment. In some examples, the virtual object 104 is optionally configured to be interactive and responsive to user input, such that a user may virtually touch, tap, move, rotate, or otherwise interact with, the virtual object 104. In some examples, the virtual object 104 may be displayed in a three-dimensional computer-generated environment with a particular orientation. For example, the virtual object 104 may be displayed in a body locked orientation, a tilt locked orientation, a head locked orientation, or a world locked orientation in the three-dimensional environment. In some such examples, as described in more detail below, while the virtual object 104 is displayed in the three-dimensional environment, the electronic device selectively moves the virtual object 104 in response to user input (e.g., direct input or indirect input) according to the particular orientation in which the virtual object is displayed. For example, the electronic device selectively moves the virtual object 104 in response to movement of a viewpoint of the user depending on whether the virtual object 104 is body locked, head locked, tilt locked, or world locked. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
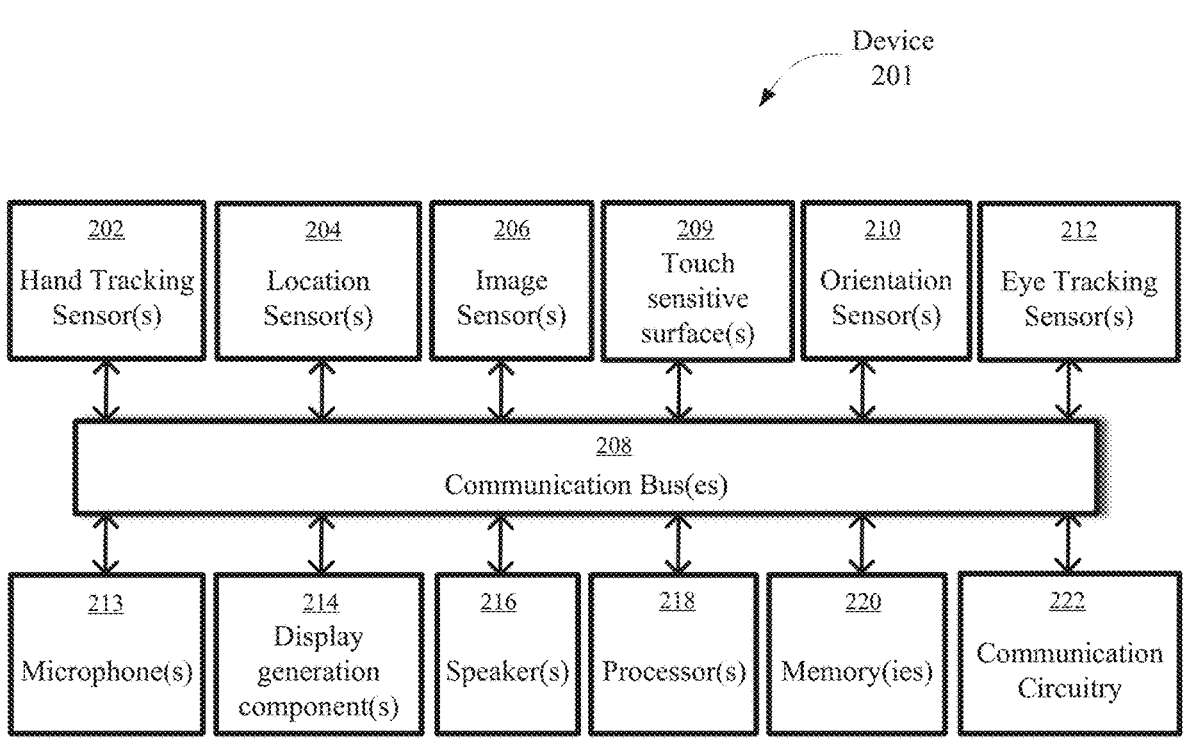
FIG. 2 illustrates a block diagram of an exemplary architecture for a device according to some examples of the disclosure.

FIG. 2 illustrates a block diagram of an exemplary architecture for a device 201 according to some examples of the disclosure. In some examples, device 201 includes one or more electronic devices. For example, the electronic device 201 may be a portable device, such as a mobile phone, smart phone, a tablet computer, a laptop computer, an auxiliary device in communication with another device, a head-mounted display, etc., respectively.

As illustrated in FIG. 2, the electronic device 201 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218, one or more memories 220, and/or communication circuitry 222. One or more communication buses 208 are optionally used for communication between the above-mentioned components of electronic devices 201.

Communication circuitry 222 optionally includes circuitry for communicating with electronic devices, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, display generation component(s) 214 include a single display (e.g., a liquid-crystal display (LCD), organic light-emitting diode (OLED), or other types of display). In some examples, display generation component(s) 214 includes multiple displays. In some examples, display generation component(s) 214 can include a display with touch capability (e.g., a touch screen), a projector, a holographic projector, a retinal projector, etc. In some examples, electronic device 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with electronic device 201 or external to electronic device 201 that is in communication with electronic device 201).

Electronic device 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206A also optionally include one or more depth sensors configured to detect the distance of physical objects from electronic device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201 uses CCD sensors, event cameras, and depth sensors in combination to detect the physical environment around electronic device 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201 uses image sensor(s) 206 to detect the position and orientation of electronic device 201 and/or display generation component(s) 214 in the real-world environment. For example, electronic device 201 uses image sensor(s) 206 to track the position and orientation of display generation component(s) 214 relative to one or more fixed objects in the real-world environment.

In some examples, electronic device 201 includes microphone(s) 213 or other audio sensors. Electronic device 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Electronic device 201 includes location sensor(s) 204 for detecting a location of electronic device 201 and/or display generation component(s) 214. For example, location sensor(s) 204 can include a GPS receiver that receives data from one or more satellites and allows electronic device 201 to determine the device's absolute position in the physical world.

Electronic device 201 includes orientation sensor(s) 210 for detecting orientation and/or movement of electronic device 201 and/or display generation component(s) 214. For example, electronic device 201 uses orientation sensor(s) 210 to track changes in the position and/or orientation of electronic device 201 and/or display generation component(s) 214, such as with respect to physical objects in the real-world environment. Orientation sensor(s) 210 optionally include one or more gyroscopes and/or one or more accelerometers.

Electronic device 201 includes hand tracking sensor(s) 202 and/or eye tracking sensor(s) 212, in some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 can use image sensor(s) 206 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some examples, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by a respective eye tracking camera/illumination source(s).

Electronic device 201 is not limited to the components and configuration of FIG. 2, but can include fewer, other, or additional components in multiple configurations. In some examples, device 201 can be implemented between two electronic devices (e.g., as a system). A person or persons using electronic device 201, is optionally referred to herein as a user or users of the device.

Attention is now directed towards interactions with one or more virtual objects that are displayed in a three-dimensional environment presented at an electronic device (e.g., corresponding to electronic device 201) in one or more orientations. As discussed below, the one or more virtual objects may be displayed in the three-dimensional environment in a body locked orientation, a head locked orientation, a tilt locked orientation, and/or a world locked orientation. In some examples, the electronic device selectively moves the one or more virtual objects in the three-dimensional environment in response to detecting movement of a viewpoint of a user of the electronic device depending on the orientation in which the one or more virtual objects are displayed in the three-dimensional environment. As described below, movement of the viewpoint of the user optionally causes the display generation component (e.g., display generation component(s) 214) to move within the physical environment surrounding the electronic device, which causes the portion of the physical environment and/or the three-dimensional environment displayed via the display generation component to be updated in accordance with the movement of the viewpoint.

FIGS. 3A-3D illustrate example interactions involving tilt locked or head locked objects in a three-dimensional environment according to some examples of the disclosure. In some examples, electronic device 301 may present a three-dimensional environment 350. The electronic device 301 may be similar to device 101 or 201 discussed above, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, or displays formed as lenses designed to be placed on a person's eyes (e.g., similar to contact lenses). In the example of FIGS. 3A-3D, a user is optionally wearing the electronic device 301, such that the three-dimensional environment 350 can be defined by X, Y and Z axes as viewed from a perspective of the electronic device (e.g., a viewpoint associated with the user of the electronic device 301). Accordingly, as used herein, the electronic device 301 is configured to be movable with six degrees of freedom based on the movement of the user (e.g., the head of the user), such that the electronic device 301 may be moved (e.g., rotated) in the roll direction, the pitch direction, and/or the yaw direction.

Figure 3A:
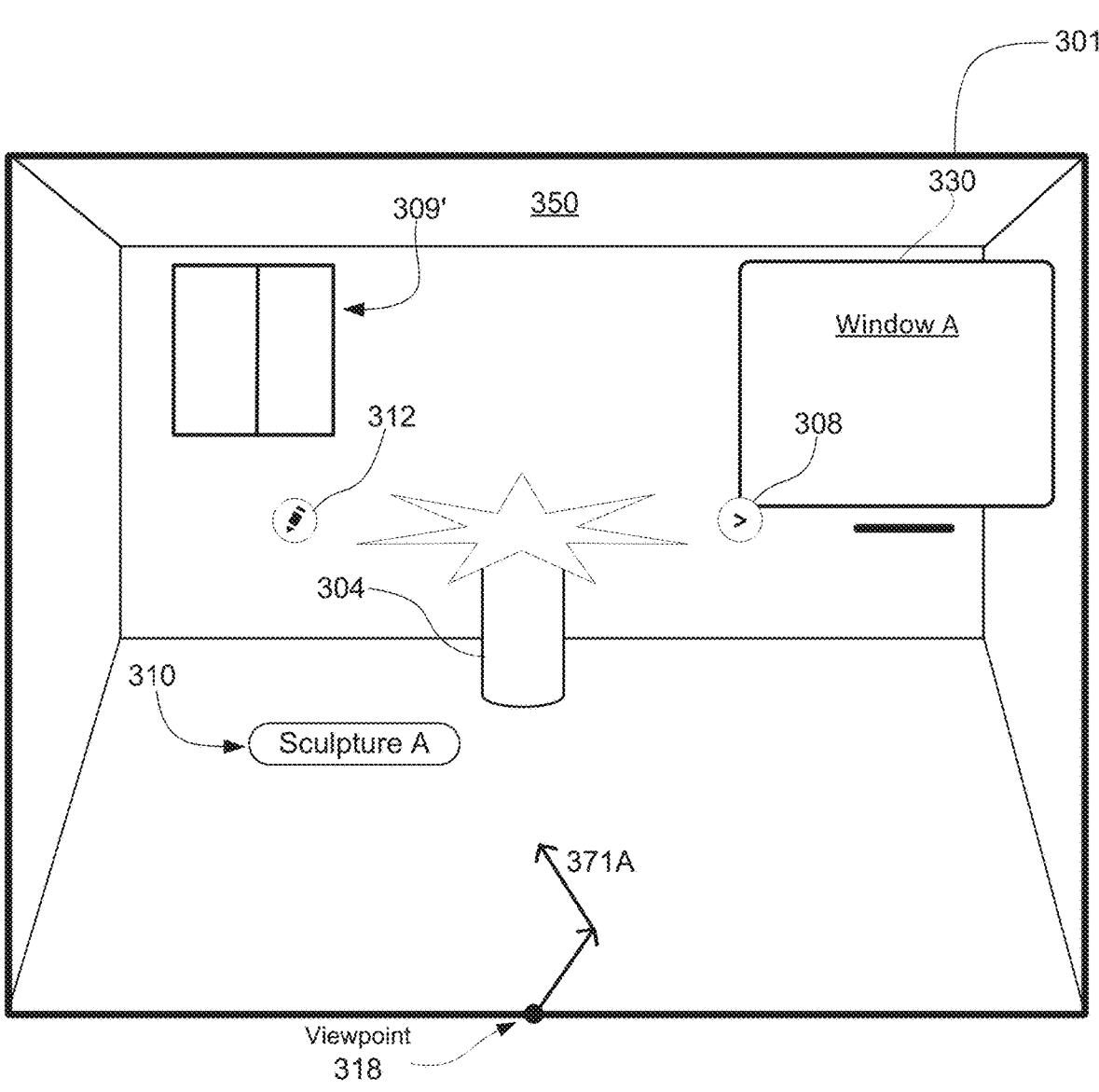
FIGS. 3A-3D illustrate example interactions involving tilt locked or head locked objects in a three-dimensional environment according to some examples of the disclosure.

As shown in FIG. 3A, the electronic device 301 may be positioned in a physical environment that includes a window 309. Thus, the three-dimensional environment 350 presented using the electronic device 301 optionally includes captured portions of the physical environment surrounding the electronic device 301, such as a representation of the window 309'. Additionally, as shown in FIG. 3A, the three-dimensional environment 350 may include representations of the floor, ceiling, and walls of the room in which the electronic device 301 is located. In some examples, the representations can include portions of the physical environment viewed through a transparent or translucent display of electronic device 301.

In some examples, the three-dimensional environment 350 may include one or more virtual objects. For example, as shown in FIG. 3A, the electronic device 301 is displaying a virtual object 304 (e.g., a virtual sculpture) and a virtual application window 330 ("Window A"). In some examples, the virtual object 304 and the application window 330 may be associated with applications running on the electronic device 301. In some examples, as discussed in more detail below, the virtual object 304 and/or the application window 330 may be interactive (e.g., selectable) to initiate movement (e.g., translation and/or rotation) of the virtual object 304 or the application window 330 within the three-dimensional environment 350 based on user input.

In some examples, as mentioned above, the one or more virtual objects may be displayed in the three-dimensional environment 350 with respective orientations that (e.g., initially) are automatically selected by the electronic device 301. For example, in FIG. 3A, the orientation of the virtual object 304 may be selected by the electronic device 301 based on object type (e.g., a three-dimensional object vs. a two-dimensional object) and/or based on object data (e.g., commands) received by the application with which the virtual object 304 is associated when the object is first displayed in the three-dimensional environment 350. In the example of FIG. 3A, the virtual object 304 may be displayed in a tilt locked orientation or a head locked orientation in the three-dimensional environment 350 and the application window 330 may be displayed in a world locked orientation in the three-dimensional environment 350. In some examples, because the virtual object 304 is tilt locked/head locked in the three-dimensional environment 350, the electronic device 301 displays the virtual object 304 at a center of the field of view of the display generation component of the electronic device 301 relative to the viewpoint of the user of the electronic device 301, as shown in FIG. 3A.

In some examples, as shown in FIG. 3A, the virtual object 304 is displayed with one or more user interface elements in the three-dimensional environment 350. For example, as shown in FIG. 3A, the virtual object 304 is displayed with a first user interface object 312 and a second user interface object 308 for interacting with the virtual object 304. As an example, the first user interface object 312 may be selectable to initiate a process for editing/modifying a visual appearance of the virtual object 304 (e.g., displaying one or more editing controls in the three-dimensional environment 350). The second user interface object 308 is optionally selectable to display a user interface of the application with which the virtual object 304 is associated. For example, the user may select a different virtual object for display in the three-dimensional environment 350 via the user interface. Additionally, as shown in FIG. 3A, the electronic device 301 optionally displays a virtual text label 310 with the virtual object 304 in the three-dimensional environment 350. In some examples, the virtual text label 310 indicates a name or title of the virtual object 304 (e.g., a title of the virtual sculpture, "Sculpture A").

In some examples, the one or more user interface elements are displayed relative to the virtual object 304 in the three-dimensional environment 350. For example, as described below, movement of the virtual object 304 in the three-dimensional environment 350 causes the first user interface object 312, the second user interface object 308, and the virtual text label 310 to move with the virtual object 304 (e.g., in a direction of the movement of the virtual object 304). As mentioned previously above, in FIG. 3A, the virtual object 304 may be displayed in the tilt locked orientation in the three-dimensional environment 350. In some examples, while the virtual object 304 is displayed in the tilt locked orientation, the one or more user interface elements (e.g., 308, 310, and 312) are displayed according to a polar coordinate system with the virtual object 304. For example, the virtual object 304, the first user interface object 312, the second user interface object 308, and the virtual text label 310 are displayed at unique locations in the three-dimensional environment 350 relative to a pole (e.g., a vertical pole) at a predefined portion of a body of the user (e.g., the user's torso). Accordingly, when the virtual object 304 is moved in the three-dimensional environment 350, the one or more user interface elements in FIG. 3A are moved in a polar coordinate space with the virtual object 304 relative to the pole at the predefined portion of the user.

In some examples, as mentioned above, the virtual object 304 may alternatively be displayed in the head locked orientation in the three-dimensional environment 350. In some examples, while the virtual object 304 is displayed in the head locked orientation, the one or more user interface elements (e.g., 308, 310, and 312) are displayed relative to a head of the user. For example, in FIG. 3A, the electronic device 301 displays the first user interface object 312, the second user interface object 308, and the virtual text label 310 at unique positions in the three-dimensional environment 350 at fixed distance and orientation offsets relative to the head of the user. Accordingly, as discussed in more detail below, if the virtual object 304 is moved within the three-dimensional environment 350, the one or more user interface elements are optionally moved with the virtual object 304 to maintain the same distances from the virtual object 304 in the three-dimensional environment 350.

In some examples, while the three-dimensional environment 350 is displayed at the electronic device 301, a viewpoint 318 of the three-dimensional environment 350 and/or a location of the viewpoint of the user optionally changes in accordance with movement/rotation of the electronic device 301 (e.g., by the user of the electronic device 301). For example, while the three-dimensional environment 350 is displayed, if the electronic device 301 is moved closer toward the representation of the window 309' (e.g., because the user of the electronic device 301 moved forward in the physical environment surrounding the electronic device 301), the viewpoint 318 of the user of the electronic device 301 would change accordingly, such that the representation of the window 309' appears larger in the user's field of view in the three-dimensional environment 350. Similarly, if the electronic device 301 moves rightward in the physical environment (e.g., because the user of the electronic device 301 moved rightward in the physical environment surrounding the electronic device 301), the viewpoint 318 of the user of the electronic device 301 would change accordingly, such that the representation of the window 309' appears farther to the left in the field of view of the three-dimensional environment 350 relative to the viewpoint 318 of the user.

In some examples, the user of the electronic device 301 may desire to view the virtual object 304 from other viewpoints relative to the virtual object 304 in the three-dimensional environment 350. For example, the user may desire to view a rear side of the virtual object 304, which is currently not visible from the viewpoint 318 in the three-dimensional environment 350 in FIG. 3A, for inspection of the virtual object 304 (e.g., to assess whether any changes should and/or need to be made to the virtual sculpture). As discussed above, the virtual object 304 is optionally tilt locked or head locked in the three-dimensional environment 350 from the viewpoint 318 of the user of the electronic device

301. Unlike world locked objects, such as the application window 330, which are displayed at fixed locations in the three-dimensional environment 350 relative to the three-dimensional environment 350, tilt locked and head locked objects move with the viewpoint 318 of the user to maintain the same distance and/orientation offset relative to a portion of the user (e.g., the user's torso or the user's head). For example, because an object that is tilt locked or head locked is displayed with a fixed distance and/or orientation offset relative to a portion of the user (e.g., the user's torso or head), the tilt locked/head locked object is moved in the three-dimensional environment 350 to remain at the fixed distance and/or orientation offset relative to the portion of the user's body at the new viewpoint of the user, as discussed below.

In FIG. 3A, the electronic device 301 optionally detects movement (e.g., translation) of the viewpoint 318 of the user relative to the three-dimensional environment 350. For example, as shown in FIG. 3A, the electronic device 301 is moved forward (e.g., diagonally) and leftward, as represented by arrow 371A, in the physical environment surrounding the electronic device 301 (e.g., because the user wearing the electronic device 301 physically moves locations in the physical environment), which causes the display generation component of the electronic device 301 to also move forward and leftward in the physical environment. In some examples, the movement (e.g., translation) of the viewpoint 318 of the user corresponds to walking forward and leftward in the physical environment to attempt to view the side and/or rear portions of the virtual object 304 (e.g., which are at least partially not visible from the current viewpoint 318 in FIG. 3A).

Figure 3B:
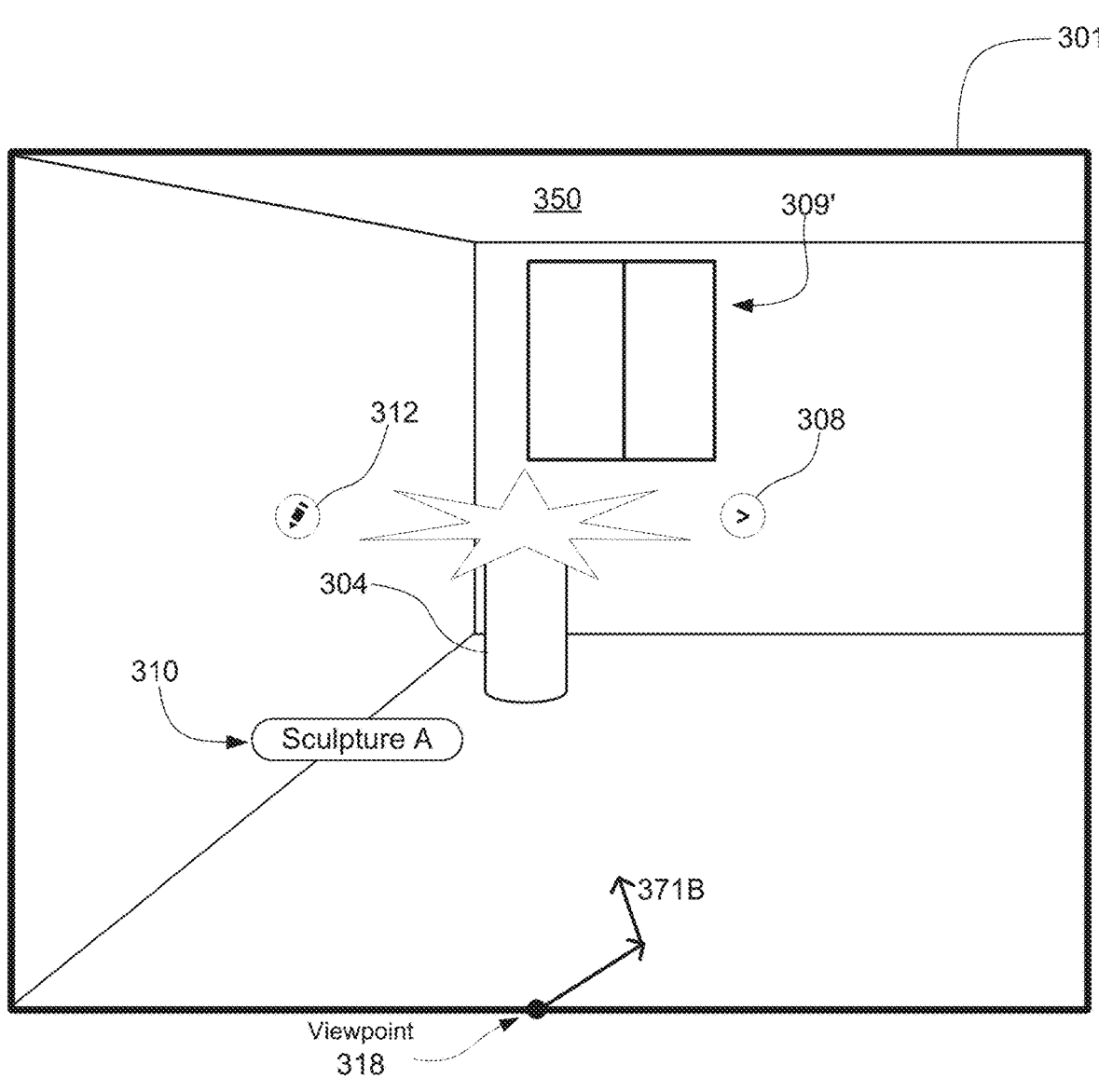

In some examples, as shown in FIG. 3B, in response to detecting the movement of the viewpoint 318 of the user of the electronic device 301, the electronic device 301 updates presentation of the three-dimensional environment 350. For example, as shown in FIG. 3B, the forward and leftward movement of the viewpoint 318 of the user causes the representation of the window 309' to be shifted rightward in the view of the three-dimensional environment 350 and to appear larger from the new viewpoint of the user. Additionally, because the viewpoint 318 has moved forward relative to the three-dimensional environment 350, a greater portion of the left side wall of the physical environment is visible in the field of view of the three-dimensional environment 350, as shown in FIG. 3B.

In some examples, as previously mentioned above, in response to detecting the movement of the viewpoint 318 of the user, the electronic device 301 moves the virtual object 304 in the three-dimensional environment 350 based on the movement of the viewpoint 318. For example, as shown in FIG. 3B, if the virtual object 304 is tilt locked in FIG. 3A, the electronic device 301 moves the virtual object 304 to maintain the same distance and/or orientation offset relative to the predefined portion of the user (e.g., the user's head or torso) in the three-dimensional environment 350 (e.g., the user's head and/or torso is facing toward the corner of the room in FIG. 3A). Alternatively, if the virtual object 304 is head locked in FIG. 3A, the electronic device 301 moves the virtual object 304 to maintain the same distance and orientation offset relative to the head of the user in the three-dimensional environment 350 (e.g., the user's head is facing toward the corner of the room in FIG. 3A), as shown in FIG. 3B. Accordingly, in either instance in which the virtual object 304 is tilt locked or head locked in the three-dimensional environment 350, the same portion of the virtual object 304 (e.g., the front-facing side of the virtual object 304 in FIG. 3A) is displayed from the viewpoint 318. Additionally, as shown in FIG. 3B, the virtual object 304 is optionally still displayed centrally in the user's field of view in the three-dimensional environment 350.

On the other hand, in response to detecting the forward and leftward movement of the viewpoint 318 of the user, the electronic device 301 forgoes moving the application window 330 in the three-dimensional environment 350 based on the movement of the viewpoint 318. For example, as shown in FIG. 3B, the application window 330 is not displayed in the view of the three-dimensional environment 350 at the same distance or orientation offset relative to the user of the electronic device 301 as shown previously in FIG. 3A. In some examples, because the application window 330 is world locked in the three-dimensional environment 350, the application window 330 remains at the same location in the three-dimensional environment 350 irrespective of the movement of the viewpoint 318. Accordingly, as shown in FIG. 3B, the application window 330 is no longer displayed in the view of the three-dimensional environment 350 from the new viewpoint 318 of the user.

Additionally, as shown in FIG. 3B, when the electronic device 301 moves the virtual object 304 in the three-dimensional environment 350, the one or more user interface elements are also moved with the virtual object 304. For example, as shown in FIG. 3B, the electronic device 301 moves the first user interface object 312, the second user interface object 308, and the virtual text label 310 with the virtual object 304. As shown in FIG. 3B, the one or more user interface elements continue to face toward the viewpoint 318 of the user when the one or more user interface elements are moved in the three-dimensional environment 350. For example, as shown in FIG. 3B, the graphical representation (e.g., icon) that is associated with the first user interface object 312 and the second user interface object 308, and the text ("Sculpture A") of the visual text label 310 continue to be visible and front-facing relative to the viewpoint 318.

In FIG. 3B, the electronic device 301 optionally detects further movement of the viewpoint 318 of the user relative to the three-dimensional environment 350. For example, as shown in FIG. 3B, the electronic device 301 is moved further forward (e.g., diagonally) and leftward, as represented by arrow 371B, in the physical environment (e.g., due to movement of the electronic device 301 by the user (e.g., moving locations within the physical environment)). In some examples, the movement (e.g., translation) of the viewpoint 318 of the user again corresponds to walking forward and leftward in the physical environment to attempt to view the side and/or rear portions of the virtual object 304 (e.g., which are at least partially not visible from the current viewpoint 318 in FIG. 3B).

Figure 3C:
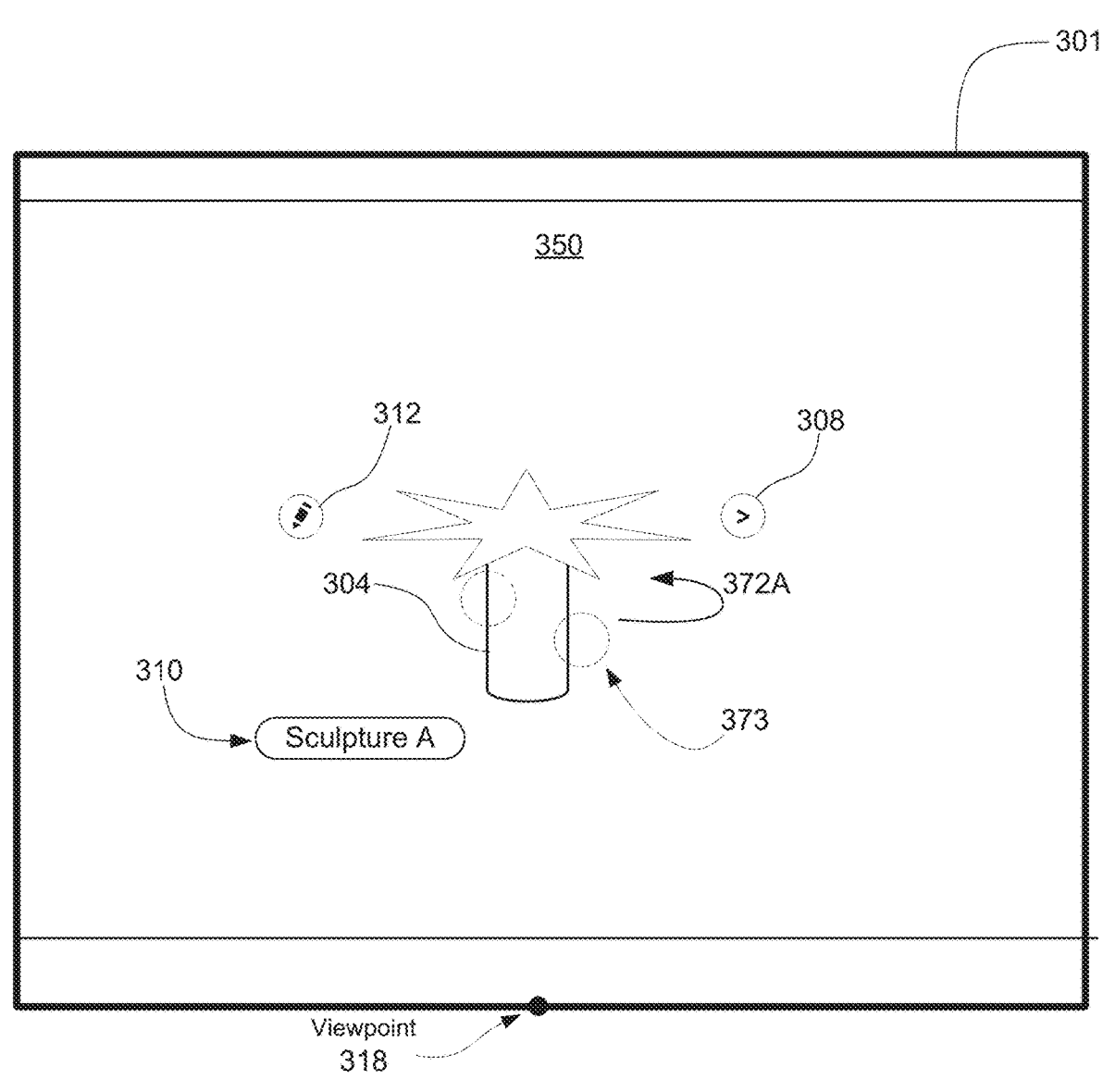

In some examples, in response to detecting the movement of the viewpoint 318 of the user, as shown in FIG. 3C, the electronic device 301 updates presentation of the three-dimensional environment 350 in accordance with the movement of the viewpoint 318. For example, as shown in FIG. 3C, the movement of the viewpoint 318 further forward (e.g., diagonally) and leftward causes the left side wall of the physical environment surrounding the electronic device 301 to occupy a significant portion of the field of view of the user. Accordingly, as shown in FIG. 3C, the representation of the window 309' is no longer visible in the view of the three-dimensional environment 350 from the new viewpoint 318 of the user.

As shown in FIG. 3C and as similarly described above, in response to detecting the further movement of the viewpoint 318, the electronic device 301 moves the virtual object 304 in the three-dimensional environment 350 based on the movement of the viewpoint. For example, as shown in FIG. 3C, the virtual object 304 continues to be displayed centrally in the field of view of the user in the three-dimensional environment 350 (e.g., at the same distance and/or orientation offset relative to the user's torso or the user's head) despite the forward and leftward movement of the electronic device 301 in the physical environment now relative to the new viewpoint 318. As similarly discussed above, when the electronic device 301 moves the virtual object 304 in the three-dimensional environment 350 based on the movement of the viewpoint 318 of the user, the electronic device 301 moves the one or more user interface elements with the virtual object 304, as shown in FIG. 3C. For example, as shown in FIG. 3C, the electronic device 301 moves the first user interface object 312, the second user interface object 308, and the virtual text label 310 with the virtual object 304 in the three-dimensional environment 350.

Thus, as outlined above with reference to FIGS. 3A-3C, despite efforts by the user to view the virtual object 304 from alternative viewpoints in the three-dimensional environment 350 (e.g., such that to view a side portion and/or the rear portion of the virtual object 304, which is currently not visible from the viewpoint 318), the same front-facing portion of the virtual object 304 in FIG. 3A continues to be displayed and visible in the three-dimensional environment 350 because the virtual object 304 is tilt locked or head locked. Accordingly, in such instances, to view an alternate side of the virtual object 304 in the three-dimensional environment 350, the user may provide direct input to rotate the virtual object 304 in the three-dimensional environment 350. For example, as shown in FIG. 3C, the electronic device 301 receives (e.g., via one or more input devices, such as hand tracking sensor(s) 202 and/or eye tracking sensor(s) 212 in FIG. 2) a selection input 373 directed to the virtual object 304, followed by a direct rotation input 374. In some examples, the electronic device 301 detects an air pinch gesture (e.g., in which an index finger and thumb of one or more hands of the user come together to make contact), a tap or touch input, a gaze dwell, or a verbal command, followed by movement of one or more hands of the user counterclockwise as shown in FIG. 3C.

Figure 3D:
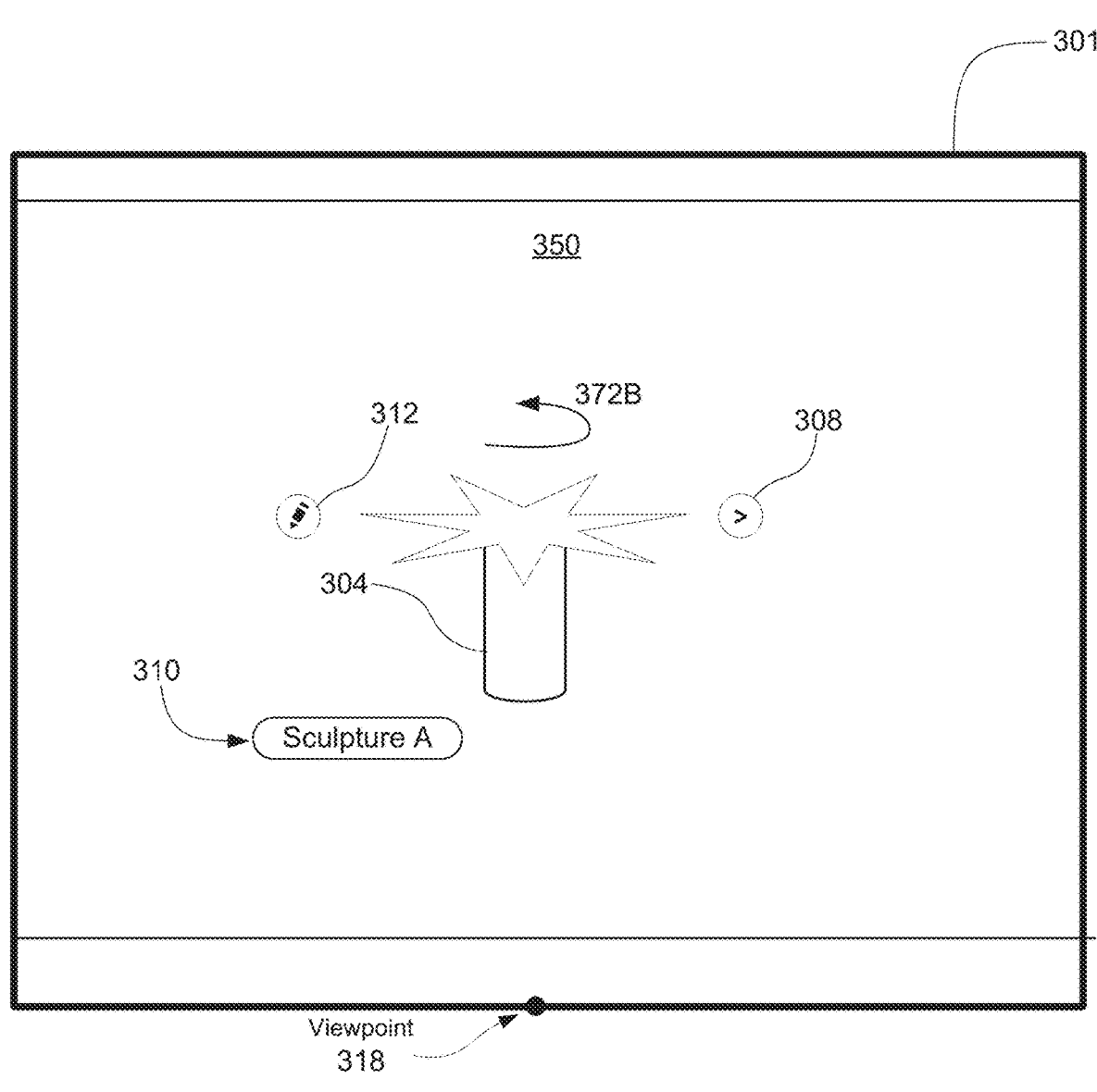

In some examples, in response to receiving the selection input 373 followed by the rotation input 372A, the electronic device 301 rotates the virtual object 304 in accordance with the rotation input 372A. For example, as shown in FIG. 3D, the electronic device 301 rotates the virtual object 304 counterclockwise 372B in the yaw direction (e.g., about a vertical axis through the virtual object 304) in the three-dimensional environment 350 in accordance with the counterclockwise rotation input 372A in FIG. 3B. In this manner, an alternate portion of the virtual object (e.g., the rear side of the virtual object 304) is now displayed in the three-dimensional environment 350 and visible from the viewpoint 318.

While providing direct input to the virtual object 304 enables the virtual object 304 to be rotated in the three-dimensional environment 350 to view alternate portions of the virtual object 304 when the virtual object 304 is displayed in the tilt locked or head locked orientation, the user may be unable to directly interact with the virtual object 304 in some instances. For example, a user may be physically unable to provide direct input with one or more hands and/or holding/interacting with one or more physical input devices (e.g., controllers, remote input devices, etc.). In other instances, the hands of the user may be occupied (e.g., holding one or more physical objects) and are thus unable to directly interact with the virtual object 304 in the manner discussed above.

Alternatively, the virtual object 304 may be displayed in a world locked orientation in the three-dimensional environment 350 (e.g., similar to the manner in which the application window 330 is displayed in FIG. 3A). In some such examples, movement (e.g., translation) of the viewpoint 318 in the manner discussed above (e.g., spatially moving the electronic device 301 within the physical environment surrounding the electronic device 301) enables alternate portions of the virtual object 304 to be visible in the user's field of view than that shown in FIG. 3A. For example, the user may "walk around" the world locked virtual object 304, which would not move based on the movement of the viewpoint of the user, to view a side and/or rear portion of the virtual object 304 (e.g., similar to the view shown in FIG. 3D). However, requiring the user to physically move within the physical environment to view alternate portions of the virtual object 304 may be undesirable. For example, the user may be unable to physically move the electronic device 301 in the physical environment to change the viewpoint 318 in the three-dimensional environment 350. In other instances, the world locked virtual object 304 may be displayed in a physical environment that does not allow the user to physically move to the side or behind the virtual object 304 (e.g., a physical environment that includes numerous obstacles (e.g., large pieces of furniture, other users, etc.)).

Accordingly, it may be advantageous to provide a method for rotating the virtual object 304 that is displayed in the head locked or tilt locked orientation in the three-dimensional environment 350 to enable the user to seamlessly inspect the virtual object 304 from different viewing angles. In some examples, as described below, the electronic device 301 rotates the virtual object 304 in the three-dimensional environment 350 in response to detecting rotation of the viewpoint 318 of the user (e.g., head rotation of the user). Attention is now directed to example interactions with a virtual object that include rotation of the viewpoint of the user of the electronic device while the virtual object is displayed in a head locked or tilt locked orientation in a three-dimensional environment.

Figure 4A:
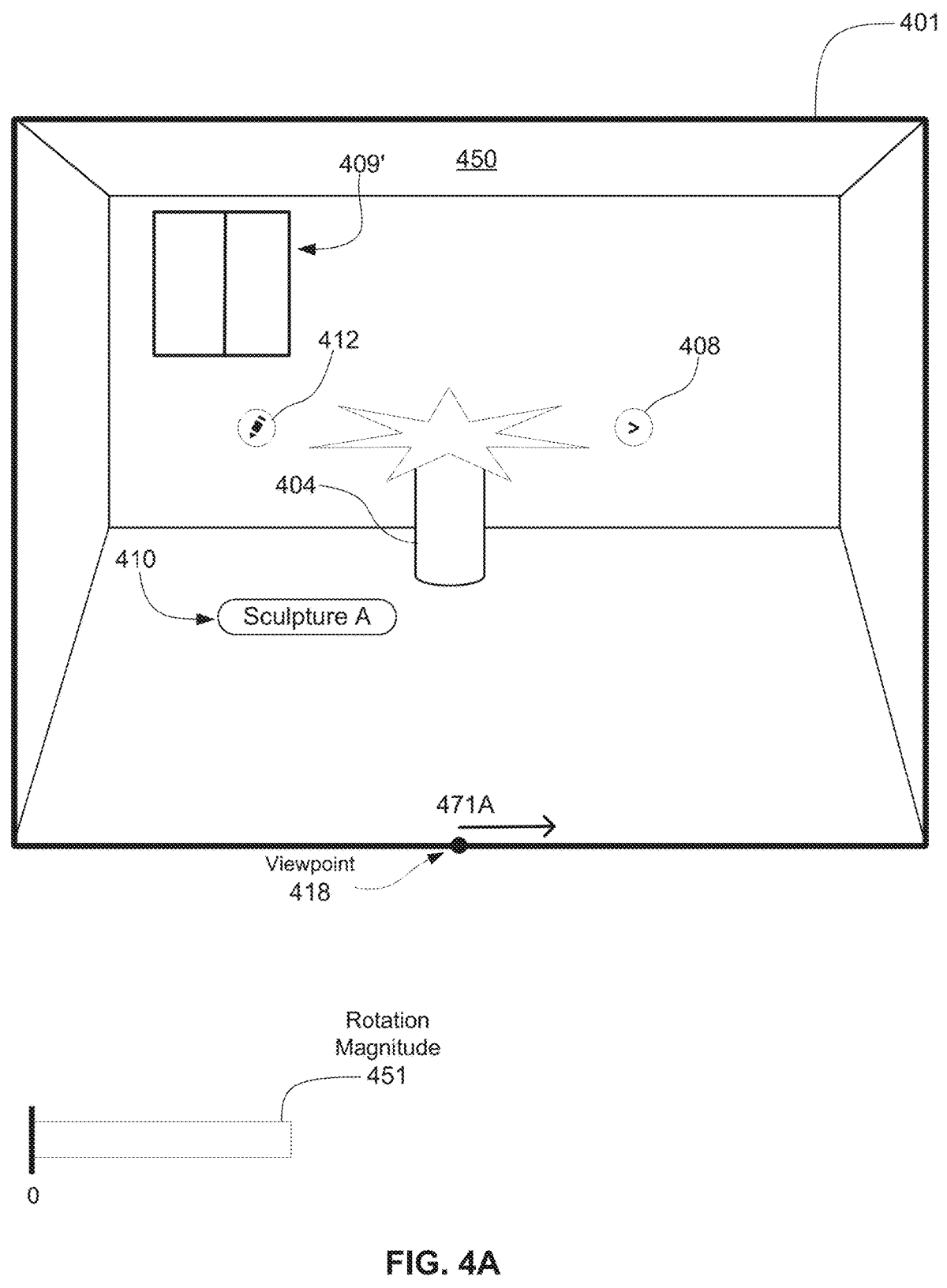
Figure 4B:
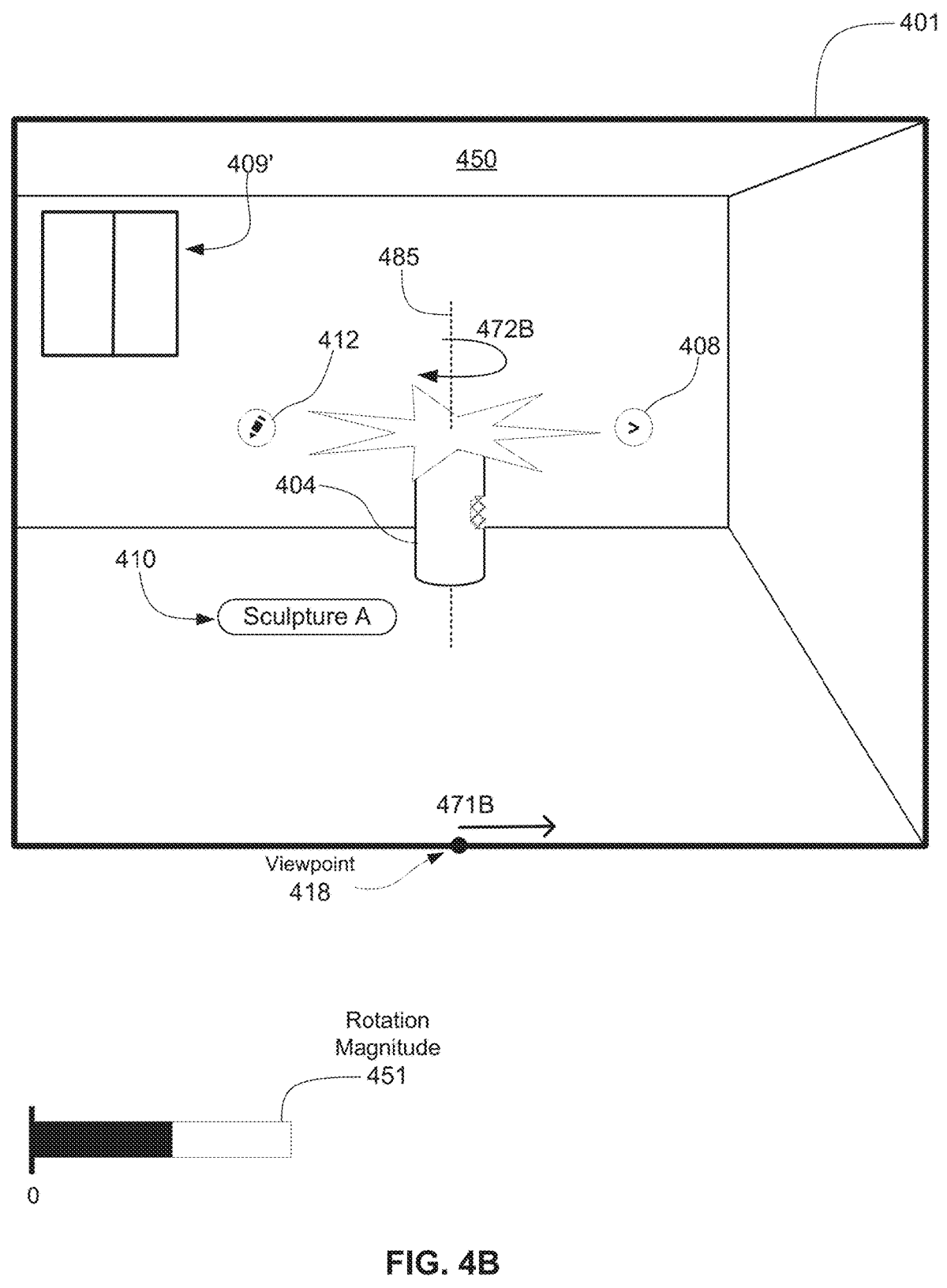
Figure 4C:
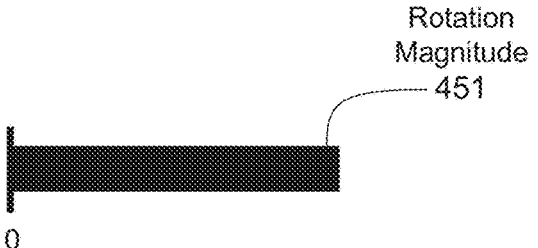
FIGS. 4A-4N illustrate example interactions for rotating a virtual object in a three-dimensional environment according to some examples of the disclosure.
Figure 4D:
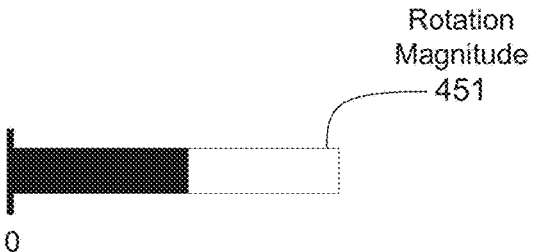
Figure 4E:
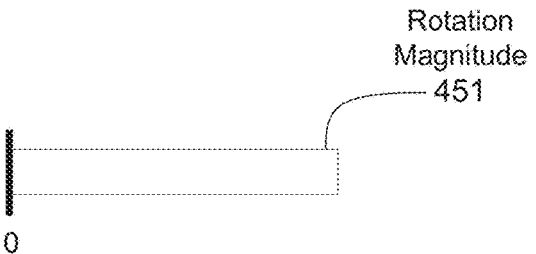
Figure 4F:
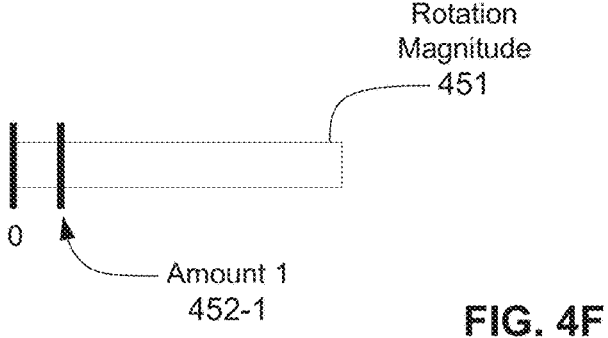
Figure 4G:
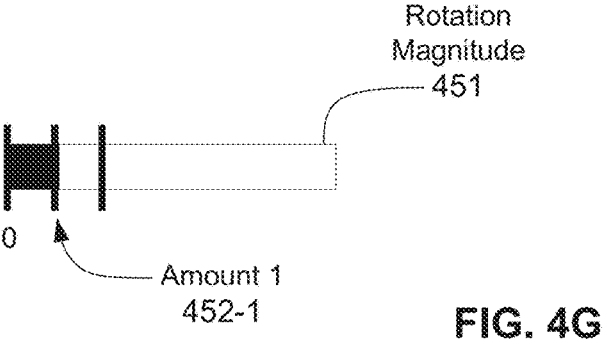
Figure 4H:
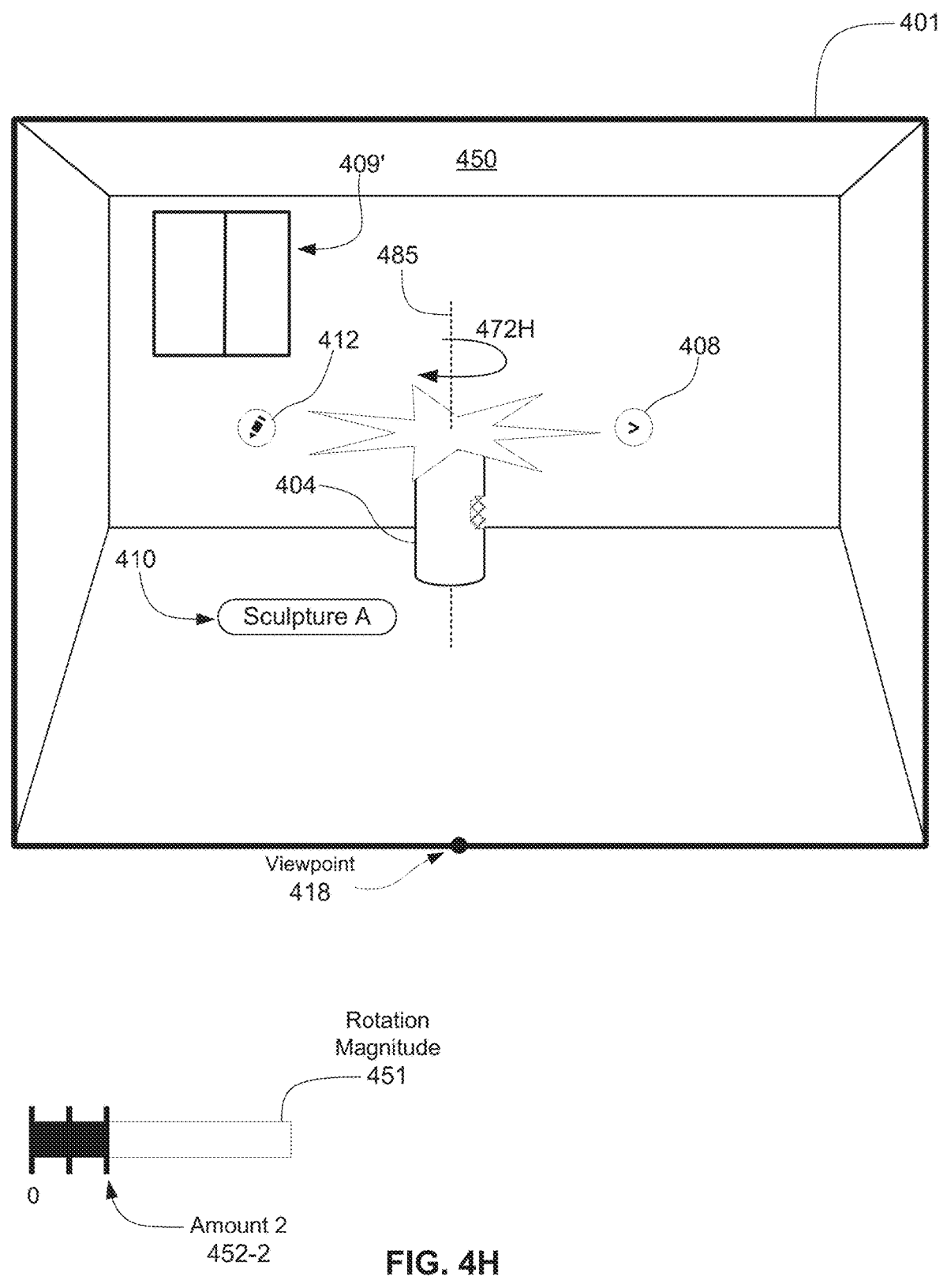
Figure 4I:
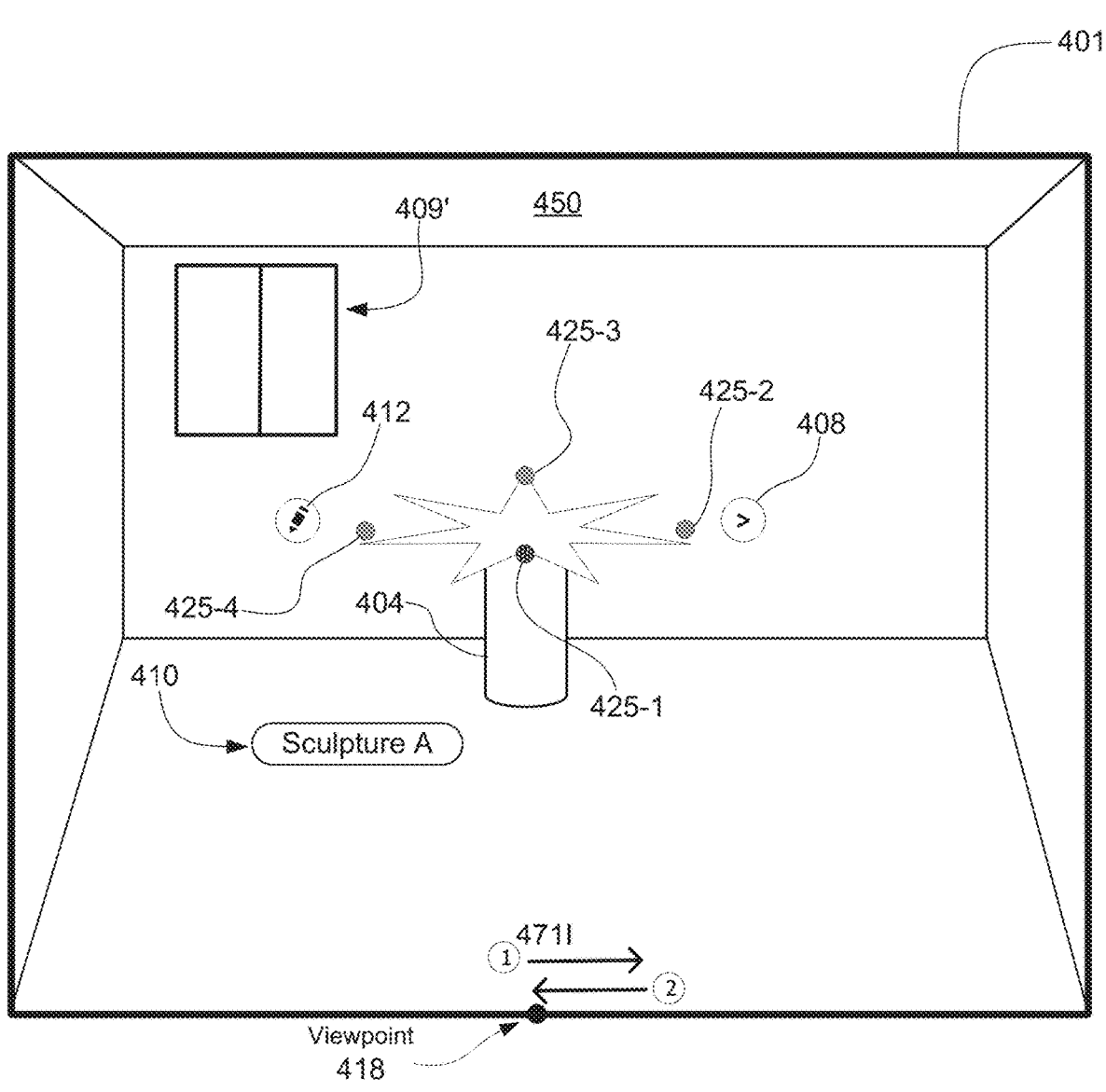
Figure 4J:
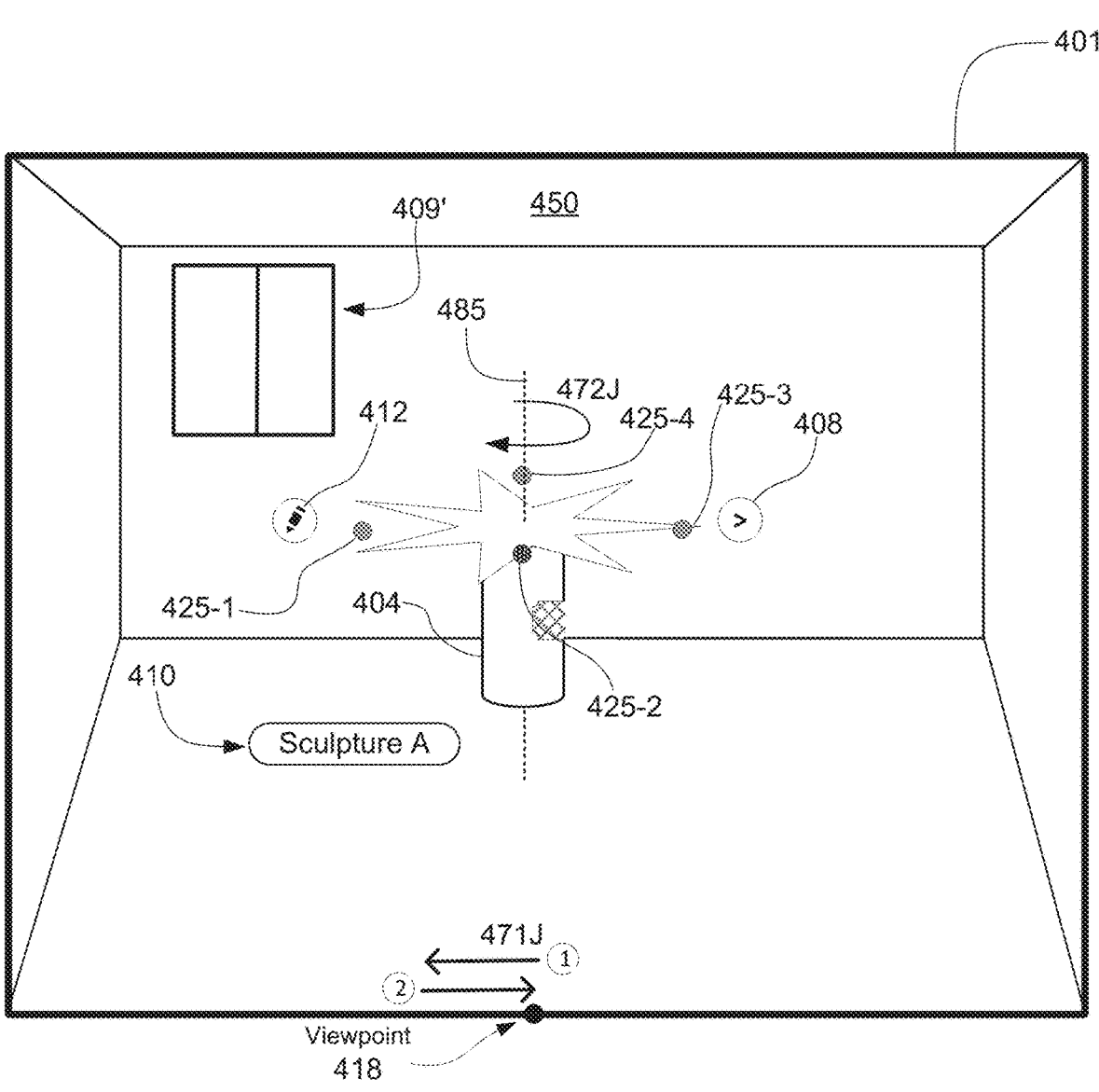
Figure 4K:
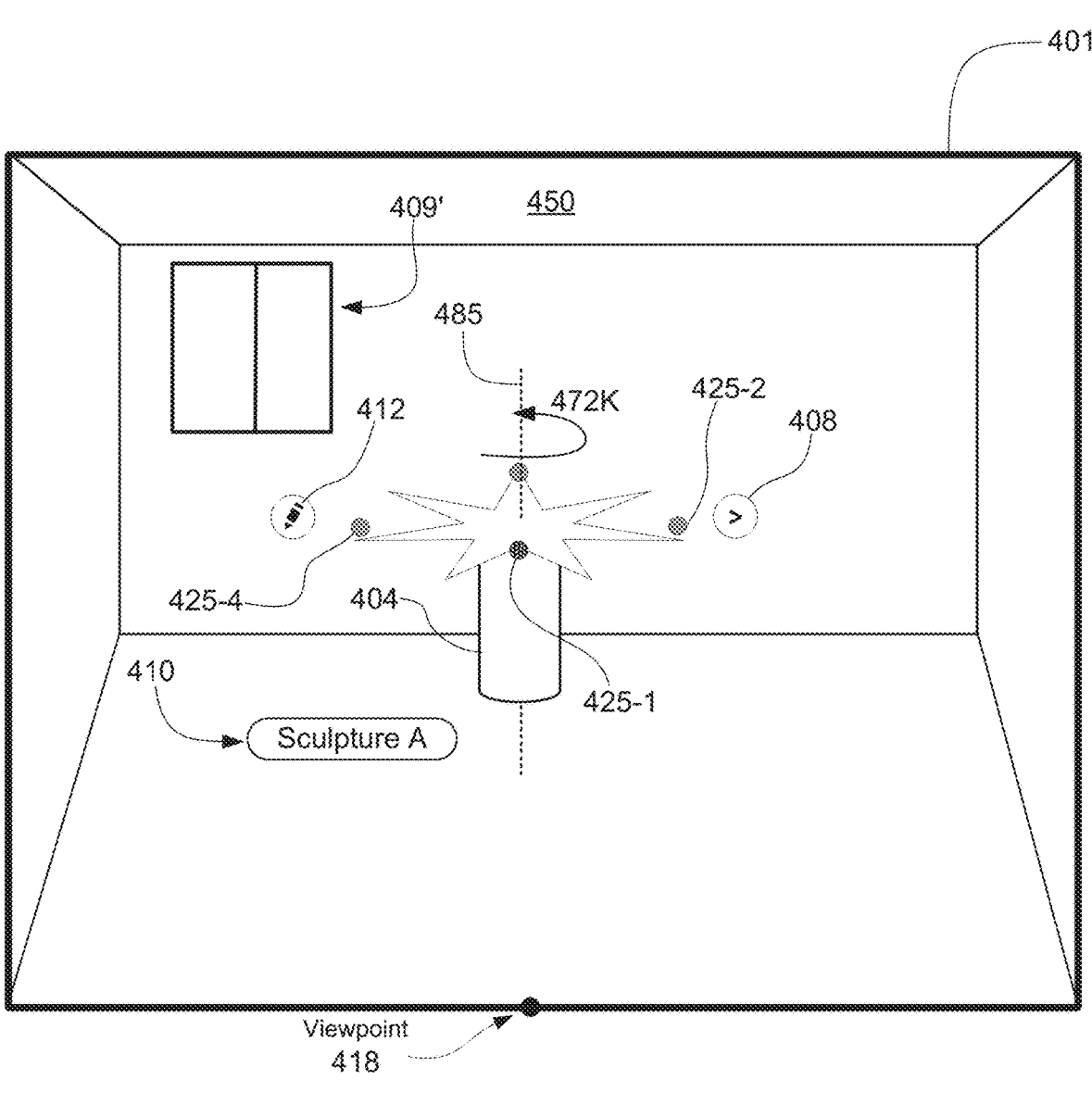
Figure 4L:
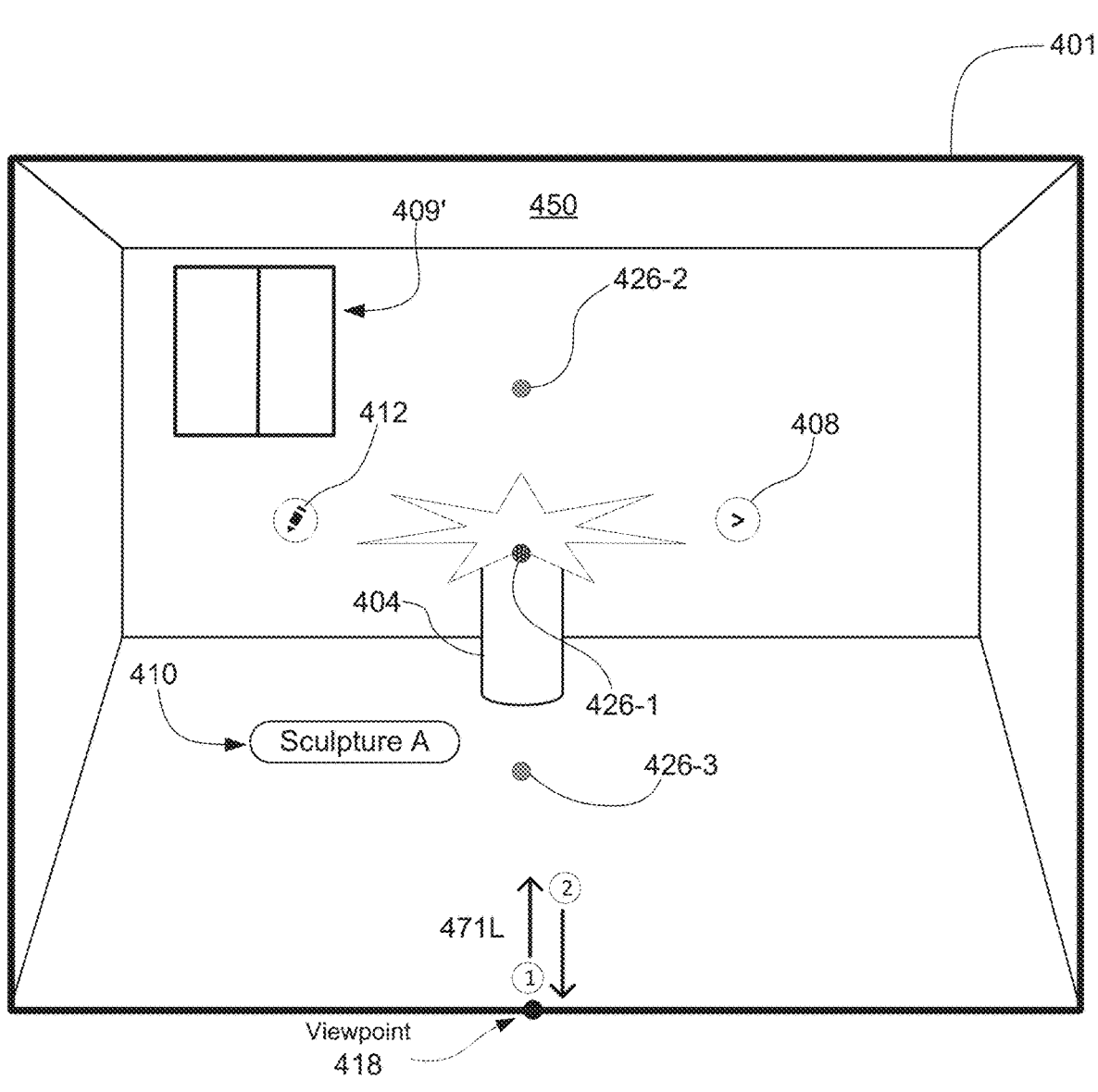
Figure 4M:
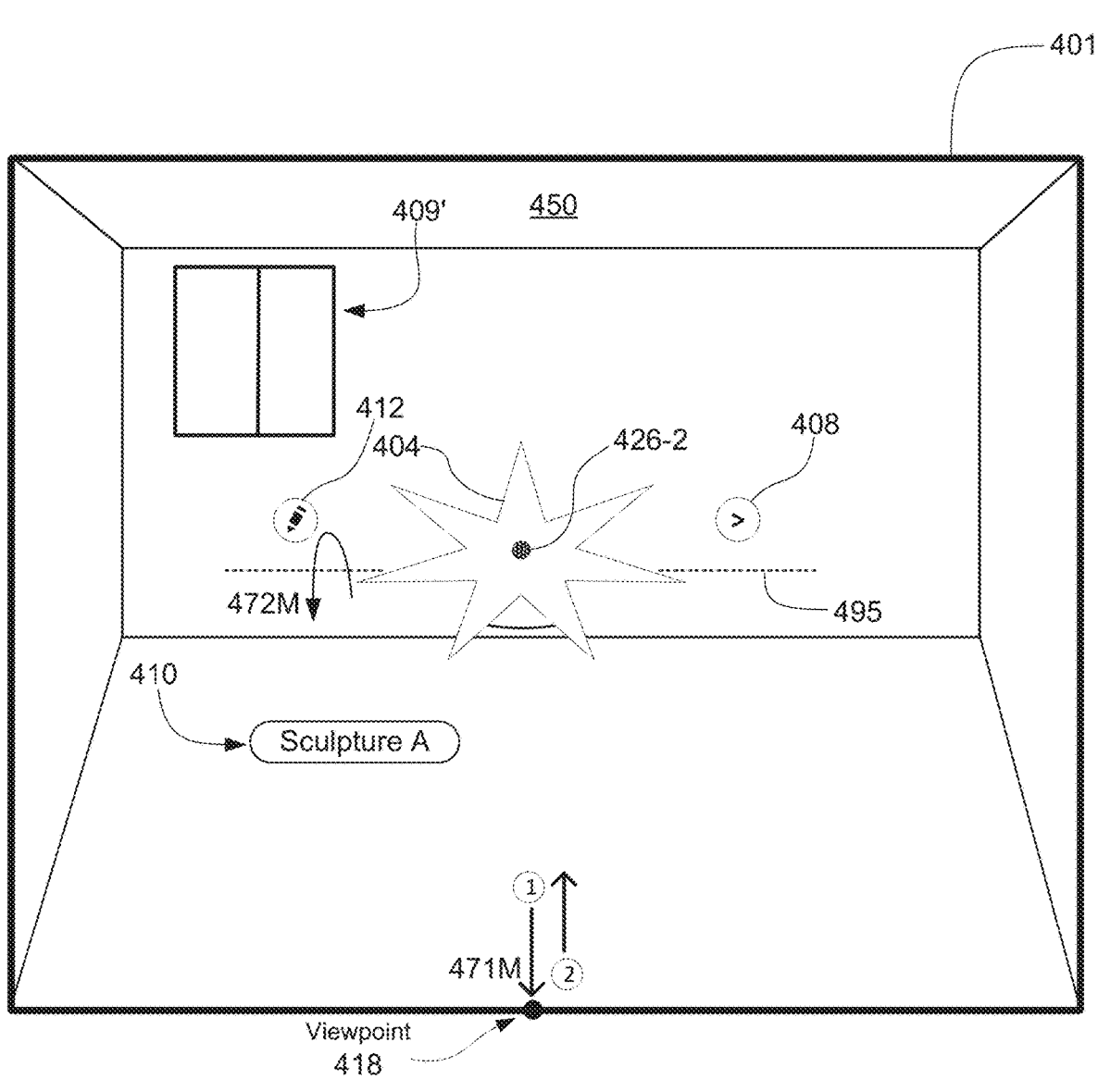
Figure 4N:
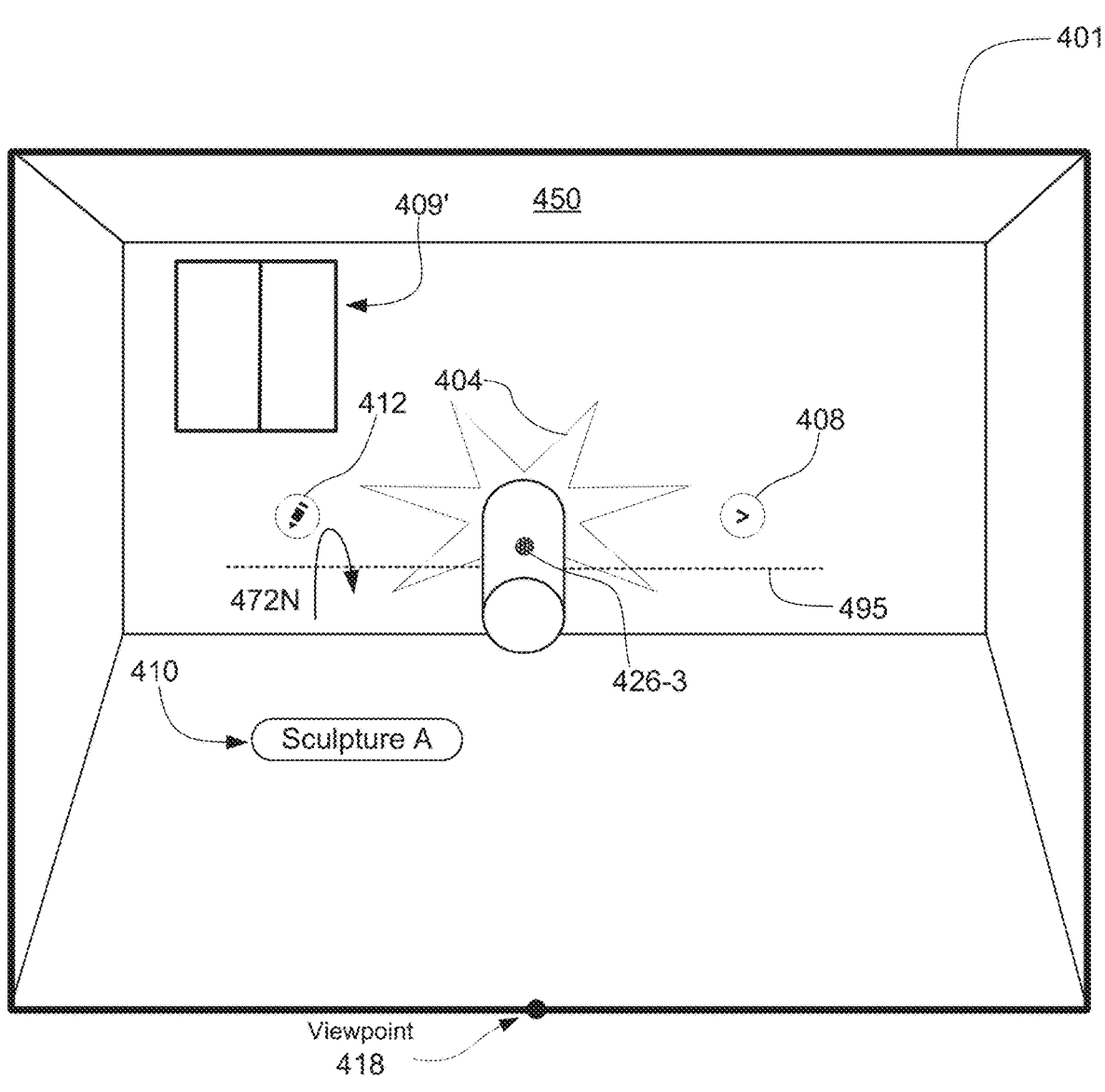

FIGS. 4A-4N illustrate example interactions for rotating a virtual object in a three-dimensional environment according to some examples of the disclosure. In some examples, as shown in FIG. 4A, a three-dimensional environment 450 may be presented using electronic device 401. In some examples, the electronic device 401 optionally corresponds to electronic device 301 discussed above. In some examples, the three-dimensional environment 450 includes captured portions of the physical environment in which electronic device 401 is located. For example, the three-dimensional environment 450 optionally includes a window (e.g., representation of window 409'), as shown in FIG. 4A. In some examples, the three-dimensional environment 450 optionally corresponds to three-dimensional environment 350 described above. In some examples, the representations can include portions of the physical environment viewed through a transparent or translucent display of electronic device 401.

As similarly discussed above, in some examples, the three-dimensional environment 450 may include one or more virtual objects that are displayed with a particular orientation relative to a viewpoint of a user of the electronic device 401. For example, as shown in FIG. 4A, the three-dimensional environment 450 at the electronic device 401 may include virtual object 404, which is optionally a virtual sculpture associated with an application running on the electronic device 401. In some examples, the virtual object 404 corresponds to virtual object 304 described above.

Additionally, in some examples, as shown in FIG. 4A, the three-dimensional environment 450 may include one or more user interface elements that are displayed with the virtual object 404. For example, as shown in FIG. 4A, the virtual object 404 is displayed with a first user interface object 412, a second user interface object 408, and a virtual text label 410. In some examples, as shown in FIG. 4A, the one or more user interface elements are displayed with an orientation that is configured to face toward the viewpoint 418 of the user of the electronic device 401. For example, the graphical representations (e.g., icons, text, etc.) included in the first user interface object 412, the second user interface object 408, and the virtual text label 410 are configured to face toward the viewpoint 418 of the user in the three-dimensional environment 450. In some examples, the one or more user interface elements correspond to the one or more user interface elements described previously above.

In some examples, as similarly described herein above, the virtual object 404 may be displayed in a particular orientation in the three-dimensional environment 450. For example, the virtual object 404 may be displayed in a body locked, head locked, tilt locked, or world locked orientation in the three-dimensional environment 450. As described above with reference to FIGS. 3A-3D, it may be advantageous to provide a method for viewing the virtual object 404 from different viewing points in the three-dimensional environment 450 without requiring the user to physical interact with the virtual object 404 (e.g., via direct hand-based input) and/or to move within the physical environment to walk around the virtual object 404. In some examples, the electronic device 401 may rotate the virtual object 404 in the three-dimensional environment 450 based on the rotation of the viewpoint 418 of the user. Typically, if the virtual object 404 is tilt locked in the three-dimensional environment 450, rotation of the viewpoint 418 causes the virtual object 404 to move in the three-dimensional environment 450 to maintain a fixed distance and/or orientation offset relative to the predefined portion of the user's body (e.g., the user's torso or head). Similarly, if the virtual object 404 is head locked in the three-dimensional environment 450, the rotation of the viewpoint 418 causes the virtual object 404 to move in the three-dimensional environment 450 to maintain a fixed distance and orientation offset relative to the user's head (e.g., as similarly shown in FIGS. 3A-3C).

Accordingly, in some examples, the display of the virtual object 404 in the three-dimensional environment 450 in the head locked or tilt locked orientation may be adjusted to correlate the rotation of the viewpoint 418 of the user to the rotation of the virtual object 404 in the three-dimensional environment 450. For example, as discussed herein below, the electronic device 401 rotates the virtual object 404 based on the rotation of the viewpoint 418 of the user while maintaining the distance and/or orientation offset according to the displayed orientation (e.g., the distance and/or orientation offset is relative to the user's torso in the tilt locked orientation and the distance and orientation offset is relative to the user's head in the head locked orientation). In some examples, the electronic device 401 rotates the virtual object 404 in the yaw direction about a vertical axis through the virtual object 404 in the three-dimensional environment 450 in response to detecting rotation of the viewpoint 418 of the user in the yaw direction (e.g., about a vertical axis through the user's head), as discussed in more detail below. In some examples, as discussed below, an amount of the rotation of the virtual object 404, represented by rotation magnitude 451 in FIG. 4A, is correlated to an amount of the rotation of the viewpoint 418 using a correlation ratio. In FIG. 4A, the rotation magnitude 451 is illustrated relative to when the virtual object 404 is first rotated (e.g., the portion of the virtual object 404 that is visible from the viewpoint 418 is associated with the "0" magnitude in the rotation magnitude 451).

In FIG. 4A, the electronic device 401 optionally detects rotation of the viewpoint 418 of the user while the virtual object 404 is displayed in the tilt locked or head locked orientation within the three-dimensional environment 450. For example, as shown in FIG. 4A, the electronic device 401 detects movement of the viewpoint 418 rightward (e.g., clockwise) in the yaw direction relative to the three-dimensional environment 450, as represented by arrow 471A. In some examples, as similarly discussed herein, the rotation of the viewpoint 418 of the user corresponds to movement of the electronic device 401 (e.g., including the display generation component of the electronic device 401) rightward in the yaw direction in the physical environment surrounding the electronic device 401. In some examples, the movement of the electronic device 401 is caused by rightward rotation of the electronic device 401 in the yaw direction by the user wearing the electronic device 401 (e.g., on the head of the user, as similarly discussed above).

In some examples, in response to detecting the rotation of the viewpoint 418 of the user rightward in the yaw direction, the electronic device 401 updates presentation of the three-dimensional environment 450 based on the rotation of the viewpoint 418. For example, as shown in FIG. 4B, the portion of the physical environment that is visible in the user's field of view is shifted leftward in the view of the three-dimensional environment 450, including the representation of the window 409'. Additionally, as shown in FIG. 4B, the floor, ceiling, and walls of the physical environment surrounding the electronic device 401 are optionally shifted leftward in the field of view of the user of the electronic device 401 relative to the viewpoint 418.

In some examples, as mentioned above, in response to detecting the rotation of the viewpoint 418 of the user, the electronic device 401 rotates the virtual object 404 in the three-dimensional environment 450 based on the rotation of the viewpoint 418, as shown in FIG. 4B. For example, as shown in FIG. 4B, the electronic device 401 rotates the virtual object 404 in the yaw direction about a vertical axis 485 through the virtual object 404 in the three-dimensional environment 450. As shown in FIG. 4B, the rotation of the virtual object 404 causes additional portions of the virtual object 404 to be visible from the viewpoint 418, such as a side portion of the virtual object 404. In some examples, the electronic device 401 begins rotating the virtual object 404 while detecting the rotation of the viewpoint 418 (e.g., such that the virtual object 404 is rotated from a beginning of the rotation of the head of the user to an end of the rotation of the head of the user). Additionally, as shown in FIG. 4B, the electronic device 401 rotates the virtual object 404 without rotating the one or more user interface elements. For example, in FIG. 4B, when the electronic device 401 rotates the virtual object 404 based on the rotation of the viewpoint 418, the electronic device 401 does not rotate the first user interface object 412, the second user interface object 408, and the virtual text label 410. As shown in FIG. 4B, the one or more user interface elements continue to face toward the viewpoint 418.

Additionally, as shown in FIG. 4B, in some examples, the electronic device 401 moves a position at which the virtual object 404 is displayed in the three-dimensional environment 450 in accordance with the rotation of the viewpoint 418. For example, as discussed above, while the virtual object 404 is displayed in the tilt locked orientation or the head locked orientation in the three-dimensional environment 450, the electronic device 401 maintains display of the virtual object 404 (independent of rotation of the virtual object 404) at a fixed distance and/or orientation offset relative to a portion of the user (e.g., the user's torso or the user's head) in the three-dimensional environment 450. Accordingly, as shown in FIG. 4B, in addition to rotating the virtual object 404 based on the rotation of the viewpoint 418, the electronic device 401 moves the virtual object 404 in the three-dimensional environment 450 to maintain the virtual object 404 at the same distance and/or orientation offset relative to the user's torso as in FIG. 4A if the virtual object 404 is tilt locked, or moves the virtual object 404 to maintain the virtual object 404 at the same distance and orientation offset relative to the user's head as in FIG. 4A if the virtual object 404 is head locked. In either case, as shown in FIG. 4B, the movement of the virtual object 404 maintains the virtual object 404 in the user's field of view despite the rotation of the viewpoint 418 (e.g., the turning of the user's head).

In some examples, the electronic device 401 rotates the virtual object 404 in a direction that is opposite the direction of the rotation of the viewpoint 418 (but in the same direction about their respective axes) in the field of view of the user. For example, as discussed above, in FIG. 4A, the electronic device 401 optionally detects the viewpoint 418 rotate rightward in the yaw direction relative to the three-dimensional environment 450. Accordingly, as shown in FIG. 4A, the electronic device 401 optionally rotates the virtual object 404 leftward in the yaw direction, as represented by arrow 472B, in the three-dimensional environment 450 relative to the viewpoint 418. In some examples, as mentioned above, the amount of rotation of the virtual object 404 (e.g., represented by the rotation magnitude 451) is correlated to the amount of rotation of the viewpoint 418 of the user according to a correlation ratio. In some examples, the correlation ratio may be 2:1, such that the electronic device 401 rotates the virtual object 404 by two degrees for every one degree of rotation of the viewpoint 418 (e.g., rotation the head of the user wearing the electronic device 401). As an example, in FIG. 4B, the electronic device 401 may detect 45 degrees of rotation of the viewpoint 418, which causes the electronic device 401 to rotate the virtual object 404 by 90 degrees in the three-dimensional environment 450 about vertical axis 485. It should be understood that other correlation ratios are possible, such that, in some examples, the electronic device 401 utilizes a correlation ratio of 1:1, 3:1, 4:1, 5:1, 3:2, 5:2, etc.

In some examples, the correlation ratio discussed above may be influenced by a speed of the rotation of the viewpoint 418. For example, as the speed of the rotation of the viewpoint 418 increases, the amount of the rotation of the virtual object 404 in the three-dimensional environment 450 increases. As an example, if the electronic device 401 detects a fast rotation of the viewpoint 418 (e.g., with a speed of rotation that exceeds a speed threshold), the electronic device 401 may rotate the virtual object 404 by 180 degrees (e.g., such that a rear side of the virtual object 404 is visible in the three-dimensional environment 450 from the viewpoint 418) or any other amount. In such an example, the electronic device 401 may rotate the virtual object 404 by 180 degrees in the yaw direction in the three-dimensional environment 450 irrespective of the amount of rotation of the viewpoint 418. For example, if the electronic device 401 detects the viewpoint 418 of the user rotate with a speed that exceeds the speed threshold but the viewpoint 418 only rotates by 20 degrees relative to the reference ray intersecting the horizon of the field of view of the user, the electronic device 401 rotates the virtual object 404 by 180 degrees in the three-dimensional environment 450 (rather than rotating the virtual object 404 by 40 degrees according to the 2:1 correlation ratio described above).

In some examples, the electronic device 401 rotates the virtual object 404 in response to detecting the rotation of the viewpoint 418 in accordance with a determination that one or more criteria are satisfied. For example, if the electronic device 401 determines that the one or more criteria are not satisfied, the electronic device 401 forgoes rotating the virtual object 404 in the manner(s) described herein. In some examples, the one or more criteria include a criterion that is satisfied when the rotation of the viewpoint 418 meets and/or exceeds a rotation threshold. In some examples, the rotation threshold corresponds to an angular threshold measured from a beginning of the rotation of the viewpoint 418. For example, the rotation of the viewpoint 418 exceeds the rotation threshold if the electronic device 401 detects rotation of the viewpoint 418 beyond 1, 2, 3, 4, 5, 10, 12, 15, etc. degrees in the yaw direction relative to a reference ray intersecting the horizon of the field of view of the user in the three-dimensional environment 450. It should be understood that, in some examples, the threshold movement may correspond to additional or alternative thresholds, such as distance thresholds, time thresholds, speed thresholds, acceleration thresholds, etc. In some examples, the one or more criteria include a criterion that is satisfied when the rotation of the viewpoint 418 includes translation of the viewpoint 418 that is below a translation threshold. In some examples, the translation threshold corresponds to a distance threshold measured from a beginning of the rotation of the viewpoint 418. For example, the rotation of the viewpoint 418 is below the translation threshold if the electronic device 401 detects translation of the viewpoint 418 below 1, 2, 3, 4, or 5 meters relative to a position of the electronic device 401 when the rotation of the viewpoint 418 is first detected. In some such examples, if the electronic device 401 detects that the user moves a distance that exceeds the translation threshold while also detecting the rotation of the viewpoint 418, the one or more criteria are not satisfied and the electronic device 401 forgoes rotating the virtual object 404 in the three-dimensional environment 450.

In FIG. 4B, the electronic device 401 detects further rotation of the viewpoint 418 of the user. For example, as shown in FIG. 4B, while the virtual object 404 is displayed in the tilt locked or head locked orientation in the three-dimensional environment 450, the electronic device 401 detects further rightward (e.g., clockwise) rotation of the viewpoint 418 of the user in the yaw direction, as represented by arrow 471B. In some examples, as similarly discussed above, the rotation of the viewpoint 418 of the user may correspond to movement of the electronic device 401 (e.g., including the display generation component of the electronic device 401) rightward in the yaw direction in the physical environment surrounding the electronic device 401 (e.g., caused by rotation of the head of the user wearing the electronic device 401).

In some examples, as shown in FIG. 4C, in response to detecting the rotation of the viewpoint 418 of the user in the yaw direction, the electronic device 401 updates presentation of the three-dimensional environment 450 based on the movement of the viewpoint 418. For example, as shown in FIG. 4C, the representation of the window 409' appears shifted leftward in the view of the three-dimensional environment 450 in accordance with the movement of the viewpoint 418, such that the representation of the window 409' is no longer in the user's field of view in the three-dimensional environment 450. Additionally, as shown in FIG. 4C, a greater portion of the right-side wall of the physical environment is visible in the field of view of the user in the three-dimensional environment 450.

In some examples, as similarly discussed above, in response to detecting the movement of the viewpoint 418 of the user rightward in the yaw direction, the electronic device 401 rotates the virtual object 404 in the three-dimensional environment 450 based on the rotation of the viewpoint 418. For example, as shown in FIG. 4C, the electronic device 401 rotates the virtual object 404 in the yaw direction about the vertical axis 485 in the three-dimensional environment 450 from the viewpoint 418. Additionally, as similarly discussed above, the electronic device 401 moves the virtual object 404 in the three-dimensional environment 450 based on the rotation of the viewpoint 418 (e.g., to maintain distance and/or orientation offset relative to a portion of the user depending on whether the virtual object 404 is head locked or tilt locked, as discussed above). As shown in FIG. 4C, the rotation of the virtual object 404 causes the rear side of the virtual object 404 to be visible in the three-dimensional environment 450 from the viewpoint 418. Additionally, as similarly discussed above, the electronic device 401 rotates the virtual object 404 by an amount (e.g., represented by the rotation magnitude 451) that is correlated to the amount of rotation of the viewpoint 418 (e.g., amount of rotation of the head of the user). Additionally, as discussed above, the electronic device 401 optionally rotates the virtual object 404 in the field of view in a direction that is opposite the direction of rotation of the viewpoint 418 relative to the viewpoint 418 (or same direction about axis 485). For example, as similarly discussed above, the rightward rotation of the viewpoint 418 in the yaw direction causes the electronic device 401 to rotate the virtual object 404 leftward in the yaw direction, as represented by arrow 472C, in the three-dimensional environment 450 from the viewpoint 418, as shown in FIG. 4C.

As discussed above, the amount of rotation of the virtual object 404 may be represented by the rotation magnitude 451 in FIG. 4C. As mentioned above, the rotation magnitude 451 may be measured from when the virtual object 404 first started rotating in the three-dimensional environment 450 (e.g., in response to the rotation of the viewpoint 418 in FIG. 4A). In the example of FIG. 4C, because the rotation of the virtual object 404 in response to the further rotation of the viewpoint 418 causes the rear side of the virtual object 404 to be displayed in the center of the field of view of the user, the rotation magnitude 451 may correspond to 180 degrees of rotation (e.g., from FIGS. 4A-4C). Accordingly, in accordance with the correlation ratio discussed above, approximately 90 degrees of rotation of the viewpoint of the user corresponds to approximately 180 degrees of rotation of the virtual object in either a clockwise or counterclockwise direction of rotation (e.g., based on the direction of rotation of the viewpoint 418, as discussed above). Accordingly, as described below, rotation of the viewpoint 418 back in the other direction from 90 degrees to 0 degrees may cause the virtual object 404 to rotate from the 180-degree view in FIG. 4C back to the 0-degree view in FIG. 4A.

In FIG. 4C, the electronic device 401 detects rotation of the viewpoint 418 leftward (e.g., counterclockwise) in the yaw direction relative to the three-dimensional environment 450. For example, while the rear side of the virtual object 404 is visible in the three-dimensional environment 450, the electronic device 401 is moved leftward in the yaw direction, as represented by arrow 471C, in the physical environment surrounding the electronic device 401 (e.g., caused by rotation of the head of the user wearing the electronic device 401). As shown in FIG. 4D, in some examples, in response to detecting the rotation of the viewpoint 418, the electronic device 401 updates presentation of the three-dimensional environment 450 in accordance with the rotation of the viewpoint 418. For example, as shown in FIG. 4D, the physical environment surrounding the electronic device 401 appears shifted to the right in the view of the three-dimensional environment 450, such that the representation of the window 409' reappears in the field of view of the user.

Additionally, as similarly discussed above, in some examples, in response to detecting the rotation of the viewpoint 418, the electronic device 401 rotates the virtual object 404 and moves the virtual object 404 in the three-dimensional environment 450 based on the rotation of the viewpoint 418. For example, as shown in FIG. 4D, the electronic device 401 rotates the virtual object 404 about the vertical axis 485 and moves the virtual object 404 in the three-dimensional environment 450 to maintain the virtual object 404 at the fixed distance and/or orientation offset relative to the user's torso or the user's head (e.g., based on whether the virtual object 404 is tilt locked or head locked). As shown in FIG. 4D, when the virtual object 404 is rotated in the three-dimensional environment 450, the side portion of the virtual object 404 is visible in the field of view of the user.

As discussed above, in FIG. 4D, the electronic device 401 rotates the virtual object in the field of view in a direction that is opposite the direction of rotation of the viewpoint 418 (or the same direction about axis 485). For example, in FIG. 4C, the electronic device 401 detects that the viewpoint 418 rotates leftward in the yaw direction relative to the three-dimensional environment 450. Accordingly, as shown in FIG. 4D, the electronic device 401 rotates the virtual object 404 rightward in the yaw direction, as represented by arrow 472D, in the three-dimensional environment 450. Additionally, as similarly discussed above, in some examples, the amount of rotation of the virtual object 404 is correlated to the amount of rotation of the viewpoint 418. For example, in FIG. 4C, when the rotation of the viewpoint 418 is detected, the virtual object 404 had been rotated 180 degrees relative to the starting orientation in FIG. 4A, as represented by the rotation magnitude 451. In FIG. 4D, in response to detecting the leftward rotation of the viewpoint 418, the electronic device 401 rotates the virtual object 404 by a respective amount (e.g., 90 degrees) rightward in the three-dimensional environment 450 (counterclockwise about axis 485), which decreases the rotation amount relative to the starting orientation in FIG. 4A, as indicated by the rotation magnitude 451.

In FIG. 4D, the electronic device 401 detects further rotation of the viewpoint 418 of the user leftward (e.g., counterclockwise) in the yaw direction, as represented by arrow 471D. For example, as similarly discussed above, while the virtual object 404 is displayed in the tilt locked or head locked orientation in the three-dimensional environment 450, the electronic device 401 (e.g., including the display generation component of the electronic device 401) is moved further leftward in the yaw direction in the physical environment surrounding the electronic device 401 (e.g., by the user wearing the electronic device 401). In some examples, in response to detecting the rotation of the viewpoint 418, the electronic device 401 updates presentation of the three-dimensional environment 450 based on the rotation of the viewpoint 418 leftward in the yaw direction. For example, as shown in FIG. 4E, the representation of the table 406' appears shifted to the right in the field of view of the user in the three-dimensional environment 450 in accordance with the rotation of the viewpoint 418. Additionally, as shown in FIG. 4E, the left side wall of the physical environment surrounding the electronic device 401 is visible in the field of view of the user after the rotation of the viewpoint 418.

In some examples, as shown in FIG. 4E, in response to detecting the further movement of the viewpoint 418 of the user, the electronic device 401 again rotates the virtual object 404 and moves the virtual object 404 in the three-dimensional environment 450 based on the rotation of the viewpoint 418. In some examples, as similarly discussed above, in FIG. 4E, because the rotation of the viewpoint 418 is leftward in the yaw direction relative to the three-dimensional environment 450, the electronic device 401 rotates the virtual object 404 rightward (e.g., counterclockwise) in the yaw direction in the three-dimensional environment 450. Additionally, as similarly discussed above, the electronic device 401 rotates the virtual object 404 in the three-dimensional environment 450 by an amount that is correlated to the amount of rotation of the viewpoint 418. In some examples, as shown in FIG. 4E, the electronic device 401 rotates the virtual object 404 by a respective amount (e.g., 90 degrees) rightward in the three-dimensional environment 450, which decreases the rotation amount relative to the starting orientation in FIG. 4A, as indicated by the rotation magnitude 451. For example, as shown in FIG. 4E, the rotation of the viewpoint 418 further leftward in the yaw direction by the respective amount causes the virtual object 404 to be rotated back to the starting orientation shown previously in FIG. 4A (e.g., in which the front side of the virtual object is facing toward the viewpoint 418). Additionally, as similarly discussed above, the electronic device 401 moves the virtual object 404 in the three-dimensional environment 450 to maintain the virtual object 404 at the fixed distance and/or orientation offset relative to the portion of the user (e.g., the user's torso or the user's head based on whether the virtual object 404 is tilt locked or head locked).

Accordingly, as described above, correlating the rotation of the virtual object 404 that is tilt locked or head locked in the three-dimensional environment 450 to the rotation of the viewpoint 418 of the user enables the virtual object 404 to be inspected from alternate viewing angles (e.g., with 360 degrees of rotation) without requiring the user to directly interact with the virtual object 404 and/or physically move in the physical environment surrounding the electronic device 401. In some examples, the electronic device 401 alternatively rotates the virtual object 404 by a predetermined amount (e.g., predetermined degrees of rotation) irrespective of an amount of the rotation of the viewpoint 418 of the user. In some such examples, as described below, the electronic device 401 rotates the virtual object 404 by the predetermined amount in response to detecting a respective gesture that includes a rotation of the viewpoint 418 (e.g., a head gesture performed by the head of the user wearing the electronic device 401).

In FIG. 4F, the electronic device 401 is displaying the virtual object 404 in the tilt locked or head locked orientation in the three-dimensional environment 450. As mentioned above, in some examples, the electronic device 401 rotates the virtual object 404 in the three-dimensional environment 450 by a predetermined amount, such as amount 452-1 ("Amount 1") in FIG. 4F, in response to detecting a respective gesture that includes rotation of the viewpoint 418. For example, in FIG. 4F, the electronic device 401 detects a head gesture performed by the head of the user wearing the electronic device 401. As indicated in FIG. 4F, the head gesture includes at least partial rotation of the viewpoint 418 of the user. For example, in FIG. 4F, the head gesture includes (1) rotation of the viewpoint 418 rightward in the yaw direction by a first amount, (e.g., immediately) followed by (2) rotation of the viewpoint 418 back to the left in the yaw direction by a second amount (e.g., optionally equal to the first amount), as represented by the arrows at 471F. In some examples, the head gesture corresponds to rotation of the head of the user rightward in the yaw direction (e.g., about the neck of the user), followed by rotation of the head leftward back to the original head position in space (e.g., when the head first began to rotate). In some examples, the electronic device 401 detects the second portion of the head gesture (e.g., rotation of the viewpoint 418 leftward) within a threshold amount of time (e.g., 0.1, 0.2, 0.5, 0.75, 1, 1.5, 2, 3, etc. seconds) of detecting the first portion of the head gesture (e.g., rotation of the viewpoint 418 rightward). In some instances, the head gesture may be referred to herein as a "head flick" or "head flick gesture".

In some examples, as shown in FIG. 4G, in response to detecting the head gesture that includes at least partial rotation of the viewpoint 418, the electronic device 401 rotates the virtual object 404 in the three-dimensional environment 450. For example, as shown in FIG. 4G, the electronic device 401 rotates the virtual object 404 about the vertical axis 485 through the virtual object 404 from the viewpoint 418. As discussed above, the electronic device 401 rotates the virtual object 404 by a predetermined amount (e.g., 5, 10, 15, 20, 25, 30, etc. degrees) about the vertical axis 485, as indicated by the rotation magnitude 451 in FIG. 4G. In some examples, as mentioned above, the electronic device 401 rotates the virtual object 404 by the predetermined amount independent of the amount of rotation of the viewpoint 418 of the user that is included in the head flick gesture discussed above. In some examples, the direction in which the virtual object 404 is rotated in the three-dimensional environment 450 relative to the viewpoint 418 of the user is based on (e.g., opposite to in the field of view) the direction of the first portion of the rotation of the viewpoint 418. For example, as previously discussed above, in FIG. 4F, the electronic device 401 detects the viewpoint 418 rotate rightward in the yaw direction (represented by "(1)" in FIG. 4F), followed by rotation of the viewpoint 418 back leftward in the yaw direction (represented by "(2)" in FIG. 4F). Accordingly, because the first portion of the rotation of the viewpoint 418 is rightward, the electronic device 401 optionally rotates the virtual object 404 leftward (e.g., clockwise) about the vertical axis 485, as represented by arrow 472G, in the three-dimensional environment 450 relative to the viewpoint 418, as shown. In some examples, had the first portion of the head gesture included rotation of the viewpoint 418 leftward instead, the electronic device 401 would have rotated the virtual object 404 rightward (e.g., counterclockwise) about the vertical axis 485 relative to the viewpoint 418.

Additionally, in some examples, as similarly discussed above, the electronic device 401 forgoes rotating the one or more user interface elements in response to detecting the head flick gesture above. For example, as shown in FIG. 4G, the electronic device 401 maintains display of the first user interface object 412, the second user interface object 408, and the virtual text label 410 as being oriented to face toward the viewpoint 418 (e.g., rather than being rotated rightward about the vertical axis 485 with the virtual object 404). As shown in FIG. 4G, the physical environment included in the three-dimensional environment 450 is not shifted in response to detecting the head gesture discussed above. In some examples, the first amount of the rotation of the viewpoint 418 ((1) in FIG. 4F) and the second amount of the rotation ((2) in FIG. 4F) included in the head gesture are equal. Accordingly, when the head gesture is performed and the electronic device 401 rotates the virtual object 404 by the predetermined amount, the viewpoint 418 is the same (or substantially the same) as in FIG. 4F. Further, because the viewpoint 418 has not moved (e.g., rotated or translated) when the head gesture is performed, the electronic device 401 does not move a position of the virtual object 404 in the three-dimensional environment 450 in response to detecting the head gesture. In some examples, while detecting the head gesture, the virtual object 404 is not rotated about the vertical axis 485 in the three-dimensional environment 450. Alternatively, in some examples, while detecting the head gesture, the electronic device 401 rotates the virtual object 404 about the vertical axis 485 in the three-dimensional environment 450 but is moved by an amount that is based on the first amount of rotation of the viewpoint 418 in the (1) first portion of the head gesture and/or the second amount of rotation of the viewpoint 418 in the (2) second portion of the head gesture.

In FIG. 4G, after rotating the virtual object 404 by the predetermined amount, the electronic device 401 detects a subsequent head gesture. For example, as shown in FIG. 4G, the electronic device 401 detects (1) rotation of the viewpoint 418 of the user rightward in the yaw direction relative to the three-dimensional environment 450 by a first amount, (e.g., immediately) followed by (2) rotation of the viewpoint 418 back to the left in the yaw direction relative to the three-dimensional environment 450, as represented by the arrows at 471G. In some examples, as similarly discussed above, the head gesture corresponds to rotation of the head of the user rightward (e.g., about the neck of the user), followed by rotation of the head leftward back to the original head position in space.

In some examples, as similarly discussed above, in response to detecting the head gesture, the electronic device 401 rotates the virtual object 404 by the predetermined amount, as represented by advancement of the rotation magnitude 451 to amount 452-2 ("Amount 2"), as shown in FIG. 4H. For example, as shown in FIG. 4H, the electronic device 401 rotates the virtual object 404 in the yaw direction about the vertical axis 485 in the three-dimensional environment 450. As similarly discussed above, the electronic device 401 optionally rotates the virtual object 404 in a direction that is based on (e.g., opposite to in the field of view) the direction of rotation of the first portion of the head gesture. In FIG. 4G, because the first portion of the head gesture corresponds to rotation of the viewpoint 418 rightward in the yaw direction (represented by (1)), the electronic device 401 rotates the virtual object 404 leftward (e.g., clockwise) about the vertical axis 485 relative to the viewpoint 418, as shown in FIG. 4H. In some examples, as shown in FIG. 4H, the rotation of the virtual object 404 clockwise about the vertical axis 485 by the predetermined amount enables the side and a portion of the rear side of the virtual object 404 to be visible in the field of view of the user.

Accordingly, as described above, rotating the virtual object 404 that is tilt locked or head locked in the three-dimensional environment 450 by a predetermined amount of rotation in response to detecting a respective gesture, such as a head gesture, enables the virtual object 404 to be inspected from alternate viewing angles (e.g., with 360 degrees of rotation) without requiring the user to directly interact with the virtual object 404 and/or physically move in the physical environment surrounding the electronic device 401.

It should be understood that, while the examples illustrated in FIGS. 4F-4H and described above specifically discuss head gestures, in some examples, the electronic device 401 rotates the virtual object 404 by the predetermined amount described above in response to detecting rotation of the viewpoint 418 (e.g., as similarly discussed with reference to FIGS. 4A-4E). For example, rotation of the viewpoint 418 of the user in a first direction (e.g., rightward) in the yaw direction, without rotation of the viewpoint 418 back in a second direction that is opposite to the first direction, causes the electronic device 401 to rotate the virtual object 404 about the vertical axis 485 in the second direction by the predetermined amount of rotation relative to the viewpoint 418, irrespective of the amount of rotation of the viewpoint 418. However, in such an example, the electronic device 401 would also move the virtual object 404 in the three-dimensional environment 450 based on the rotation of the viewpoint to maintain the virtual object 404 at a fixed distance and/or orientation offset relative to the portion of the user (e.g., the user's torso if the virtual object 404 is tilt locked or the user's head if the virtual object 404 is head locked, as previously discussed herein).

In some examples, the virtual object 404 may be associated with one or more predetermined viewing points in the three-dimensional environment 450. For example, as shown in FIG. 4I, the virtual object 404 may be associated with a first predetermined viewing point 425-1, a second predetermined viewing point 425-2, a third predetermined viewing point 425-3, and a fourth predetermined viewing point 425-4. In some examples, the predetermined viewing points are established by the application with which the virtual object 404 is associated. In some examples, the predetermined viewing points are established (e.g., arbitrarily) by the electronic device 401. For example, each predetermined viewing point may be equidistant from an adjacent predetermined viewing point, such that the first predetermined viewing point 425-1 is located 90 degrees from the second predetermined viewing point 425-2 in the three-dimensional environment 450. In some examples, the first predetermined viewing point 425-1 corresponds to a front view of the virtual object 404, the second predetermined viewing point 425-2 corresponds to a right-side view of the virtual object 404 (e.g., from the viewpoint 418), the third predetermined viewing point 425-3 corresponds to a rear view of the virtual object 404, and the fourth predetermined viewing point 425-4 corresponds to a left side view of the virtual object 404. In some examples, the association of the predetermined viewing points with the virtual object 404 is independent of the positions in the three-dimensional environment 450 at which the one or more user interface elements are displayed (e.g., the first user interface object 412, the second user interface object 408, and the virtual text label 410).

In some examples, the electronic device 401 transitions from displaying the virtual object 404 at a first predetermined viewing point to displaying the virtual object 404 at a second predetermined viewing point in response to detecting a respective gesture that includes at least partial rotation of the viewpoint 418 of the user. As similarly discussed above, the respective gesture may correspond to a head gesture (e.g., a head flick gesture). In FIG. 4F, the electronic device 401 detects a head gesture performed by the head of the user wearing the electronic device 401. For example, as shown in FIG. 4F, the electronic device 401 detects (1) rotation of the viewpoint 418 rightward in the yaw direction by a first amount, (e.g., immediately) followed by (2) rotation of the viewpoint 418 back to the left in the yaw direction by a second amount (e.g., optionally equal to the first amount), as represented by the arrows at 4711. In some examples, the head gesture corresponds to rotation of the head of the user rightward in the yaw direction (e.g., about the neck of the user), followed by rotation of the head leftward back to the original head position in space (e.g., when the head first began to rotate).

In some examples, as shown in FIG. 4J, in response to detecting the head gesture, the electronic device 401 transitions from displaying the virtual object 404 at the first predetermined viewing point 425-1 to displaying the virtual object 404 at the second predetermined viewing point 425-2 in the three-dimensional environment 450. For example, as shown in FIG. 4J, the electronic device 401 rotates the virtual object 404 about the vertical axis 485 such that the right-side view of the virtual object 404 associated with the second predetermined viewing point 425-2 is displayed at the center of the field of view of the user and facing toward the viewpoint 418 in the three-dimensional environment 450.

As shown in FIG. 4J, the electronic device 401 transitions from displaying the virtual object 404 at the first predetermined viewing point 425-1 to displaying the virtual object 404 at the second predetermined viewing point 425-2 without rotating and/or translating the one or more user interface elements in the three-dimensional environment 450. For example, as similarly discussed above, because the head gesture does not include a full rotation of the viewpoint 418, the user's head and/or torso remain unchanged relative to their positions in space in FIG. 4I, which causes the electronic device 401 to maintain display of the first user interface object 412, the second user interface object 408, and the virtual text label 410 at their respective positions in the three-dimensional environment 450, as shown in FIG. 4J. Additionally, as shown in FIG. 4J, the electronic device 401 transitions display of the virtual object 404 to the second predetermined viewing point 425-2 without moving the virtual object 404 (e.g., independent of the rotation of the virtual object 404) within the three-dimensional environment 450. For example, as similarly discussed above, because the head gesture does not include a full rotation of the viewpoint 418, the user's head and/or torso remain unchanged relative to their positions in space in FIG. 4I, which causes the electronic device 401 to maintain display of the virtual object 404 at the fixed distance and/or orientation offset relative to the user's head or torso depending on whether the virtual object 404 is head locked or tilt locked.

In some examples, the particular predetermined viewing point to which the electronic device 401 transitions in response to detecting the head gesture above is based on the direction of rotation of the viewpoint 418 included in the first portion of the head gesture. For example, as previously discussed above, in FIG. 4I, the electronic device 401 detects the viewpoint 418 rotate rightward in the yaw direction (represented by "(1)" in FIG. 4I), followed by rotation of the viewpoint 418 back leftward in the yaw direction (represented by "(2)" in FIG. 4I). Accordingly, because the first portion of the head gesture includes rotation of the viewpoint 418 rightward, the electronic device 401 optionally rotates the virtual object 404 leftward (e.g., clockwise) about the vertical axis 485, as represented by arrow 472J, in the three-dimensional environment 450 relative to the viewpoint 418, which corresponds to transitioning display of the virtual object 404 from the first predetermined viewing point 425-1 to the second predetermined viewing point 425-2, as shown. Additionally, as alluded to above, the electronic device 401 rotates the virtual object 404 by an amount that corresponds to a difference between the second predetermined viewing point 425-2 and the first predetermined viewing point 425-1 (e.g., and irrespective of the amount of rotation of the viewpoint 418 in the first portion of the head gesture).

In FIG. 4J, after rotating the virtual object 404 to transition from the first predetermined viewing point 425-1 to the second predetermined viewing point 425-2, the electronic device 401 detects a subsequent head gesture. For example, as shown in FIG. 4J, the electronic device 401 detects (1) rotation of the viewpoint 418 of the user leftward in the yaw direction relative to the three-dimensional environment 450 by a first amount, (e.g., immediately) followed by (2) rotation of the viewpoint 418 back to the right in the yaw direction relative to the three-dimensional environment 450, as represented by the arrows at 471J. In some examples, as similarly discussed above, the head gesture corresponds to rotation of the head of the user leftward (e.g., about the neck of the user), followed by rotation of the head rightward back to the original head position in space.

In some examples, in response to detecting the head gesture, the electronic device 401 transitions from displaying the virtual object 404 at the second predetermined viewing point 425-2 to redisplaying the virtual object 404 at the first predetermined viewing point 425-1, as shown in FIG. 4K. For example, as shown in FIG. 4K, the electronic device 401 rotates the virtual object 404 in the yaw direction about the vertical axis 485 in the three-dimensional environment 450. As similarly discussed above, the predetermined viewing point that the electronic device 401 transitions display of the virtual object 404 to is based on (e.g., opposite to in the field of view) the direction of rotation of the first portion of the head gesture. In FIG. 4J, because the first portion of the head gesture corresponds to rotation of the viewpoint 418 leftward in the yaw direction (represented by (1)), the electronic device 401 rotates the virtual object 404 rightward (e.g., counterclockwise) about the vertical axis 485, as represented by arrow 472K, relative to the viewpoint 418, corresponding to transitioning display of the virtual object 404 back to the first predetermined viewing point 425-1, as shown in FIG. 4H. In some examples, as shown in FIG. 4K, when the electronic device 401 transitions display of the virtual object 404 from the second predetermined viewing point 425-2 to the first predetermined viewing point 425-1, the front view of the virtual object 404 is redisplayed in the center of the user's field of view and facing the viewpoint 418. Accordingly, as described above, rotating the virtual object 404 that is tilt locked or head locked in the three-dimensional environment 450 when transitioning display of the virtual object 404 between predetermined viewing points in response to detecting a respective gesture, such as a head gesture, enables the virtual object 404 to be inspected from alternate viewing angles (e.g., with 360 degrees of rotation) without requiring the user to directly interact with the virtual object 404 and/or physically move in the physical environment surrounding the electronic device 401.

It should be understood that, while the examples illustrated in FIGS. 4I-4K and described above specifically discuss head gestures, in some examples, the electronic device 401 transitions display of the virtual object 404 between predetermined viewing points in the three-dimensional environment 450 in response to detecting rotation of the viewpoint 418 (e.g., as similarly discussed with reference to FIGS. 4A-4E). For example, rotation of the viewpoint 418 of the user in a first direction (e.g., rightward) in the yaw direction, without rotation of the viewpoint 418 back in a second direction that is opposite to the first direction, causes the electronic device 401 to transition from displaying the virtual object 404 at the first predetermined viewing point 425-1 to displaying the virtual object 404 at the second predetermined viewing point 425-2 (as shown in FIG. 4J), which includes rotating the virtual object 404 about the vertical axis 485 in the second direction (e.g., clockwise) relative to the viewpoint 418. However, in such an example, the electronic device 401 would also move the virtual object 404 in the three-dimensional environment 450 based on the rotation of the viewpoint to maintain the virtual object 404 at a fixed distance and/or orientation offset relative to the portion of the user (e.g., the user's torso if the virtual object 404 is tilt locked or the user's head if the virtual object 404 is head locked, as previously discussed herein).

In some examples, the virtual object 404 may alternatively be rotated in the pitch direction in the three-dimensional environment 450 in response to detecting rotation of the viewpoint of the user. For example, the electronic device 401 may rotate the virtual object 404 about a horizontal axis through the virtual object in the pitch direction in the three-dimensional environment 450 in response to detecting rotation of the viewpoint 418 in the pitch direction (e.g., tilting of the head of the user that is wearing the electronic device 401 upward or downward about the neck of the user). In some examples, as similarly described above, the electronic device 401 scales the rotation of the virtual object 404 in the pitch direction in response to detecting the rotation of the viewpoint 418 in the pitch direction. For example, the electronic device 401 rotates the virtual object 404 by a predetermined amount (e.g., similarly discussed above) in the pitch direction in the three-dimensional environment 450 in response to detecting a head gesture (e.g., a head flick as discussed above).

Following the example discussed above, in some examples, the virtual object 404 may be associated with one or more predetermined viewing points in the three-dimensional environment 450. For example, as shown in FIG. 4L, the virtual object 404 may be associated with a first predetermined viewing point 426-1, a second predetermined viewing point 426-2, and a third predetermined viewing point 426-3. In some examples, the first predetermined viewing point 426-1 may correspond to a front view of the virtual object 404, the second predetermined viewing point 426-2 may correspond to a top view of the virtual object 404, and the third predetermined viewing point 426-3 may correspond to a bottom view of the virtual object 404 in the three-dimensional environment 450 from the viewpoint 418.

As similarly discussed above, the electronic device 401 optionally transitions the display of the virtual object 404 between predetermined viewing points in response to detecting a respective gesture (e.g., a head gesture) that includes at least partial rotation of the viewpoint 418 of the user. In FIG. 4L, while displaying the virtual object 404 tilt locked or head locked in the three-dimensional environment 450, the electronic device 401 detects a head gesture (e.g., a head flick gesture) performed by the head of the user wearing the electronic device 401. For example, as shown in FIG. 4L, the electronic device 401 detects (1) rotation of the viewpoint 418 upward in the pitch direction by a first amount, (e.g., immediately) followed by (2) rotation of the viewpoint 418 back down in the pitch direction by a second amount (e.g., optionally equal to the first amount), as represented by the arrows at 471L. In some examples, the head gesture corresponds to tilting of the head of the user upward in the pitch direction (e.g., about the neck of the user), followed by tilting of the head back downward to the original head position in space (e.g., when the head first began to tilt/rotate).

In some examples, as shown in FIG. 4M, in response to detecting the head gesture, the electronic device 401 transitions from displaying the virtual object 404 at the first predetermined viewing point 426-1 to displaying the virtual object 404 at the second predetermined viewing point 426-2 in the three-dimensional environment 450. For example, as shown in FIG. 4M, the electronic device 401 rotates the virtual object 404 about the horizontal axis 495 such that the top view of the virtual object 404 associated with the second predetermined viewing point 426-2 is displayed at the center of the field of view of the user and facing toward the viewpoint 418 in the three-dimensional environment 450.

As shown in FIG. 4M, as similarly discussed above, the electronic device 401 transitions from displaying the virtual object 404 at the first predetermined viewing point 426-1 to displaying the virtual object 404 at the second predetermined viewing point 426-2 without rotating and/or translating the one or more user interface elements in the three-dimensional environment 450. For example, as similarly discussed above, because the head gesture does not include a full rotation of the viewpoint 418, the user's head and/or torso remain unchanged relative to their positions in space in FIG. 4L, which causes the electronic device 401 to maintain display of the first user interface object 412, the second user interface object 408, and the virtual text label 410 at their respective positions in the three-dimensional environment 450, as shown in FIG. 4M. Additionally, as shown in FIG. 4M, the electronic device 401 transitions display of the virtual object 404 to the second predetermined viewing point 426-2 without moving the virtual object 404 (e.g., independent of the rotation of the virtual object 404) within the three-dimensional environment 450. For example, as similarly discussed above, because the head gesture does not include a full rotation of the viewpoint 418, the user's head and/or torso remain unchanged relative to their positions in space in FIG. 4L, which causes the electronic device 401 to maintain display of the virtual object 404 at the fixed distance and/or orientation offset relative to the user's head or torso depending on whether the virtual object 404 is head locked or tilt locked, as shown in FIG. 4M.

In some examples, the particular predetermined viewing point to which the electronic device 401 transitions in response to detecting the head gesture above is based on the direction of rotation of the viewpoint 418 included in the first portion of the head gesture. For example, as previously discussed above, in FIG. 4M, the electronic device 401 detects the viewpoint 418 rotate upward in the pitch direction (represented by "(1)" in FIG. 4L), followed by rotation of the viewpoint 418 back downward in the pitch direction (represented by "(2)" in FIG. 4L). Accordingly, because the first portion of the head gesture includes rotation of the viewpoint 418 upward, the electronic device 401 optionally rotates the virtual object 404 downward (e.g., counterclockwise) about the horizontal axis 495, as represented by arrow 472M, in the three-dimensional environment 450 relative to the viewpoint 418, which corresponds to transitioning display of the virtual object 404 from the first predetermined viewing point 426-1 to the second predetermined viewing point 426-2, as shown. Additionally, as alluded to above, the electronic device 401 rotates the virtual object 404 by an amount that corresponds to a difference between the second predetermined viewing point 426-2 and the first predetermined viewing point 426-1 (e.g., and irrespective of the amount of rotation of the viewpoint 418 in the first portion of the head gesture).

In some examples, if the first portion of the head gesture discussed above (e.g., with reference to FIG. 4L) alternatively includes rotation of the viewpoint 418 downward, the electronic device 401 alternatively transitions from displaying the virtual object 404 at the first predetermined viewing point 426-1 to the third predetermined viewing point 426-3 in the three-dimensional environment 450. For example, as shown in FIG. 4M, the head gesture detected in FIG. 4L discussed above may alternatively include (1) rotation of the viewpoint 418 downward in the pitch direction by a first amount, (e.g., immediately) followed by (2) rotation of the viewpoint 418 back up in the pitch direction by a second amount (e.g., optionally equal to the first amount), as represented by the arrows at 471M. In some examples, the head gesture corresponds to tilting of the head of the user downward in the pitch direction (e.g., about the neck of the user), followed by tilting of the head back upward to the original head position in space (e.g., when the head first began to tilt/rotate).

In some examples, in response to detecting the alternative head gesture of FIG. 4M while displaying the virtual object 404 as shown in FIG. 4L, the electronic device 401 transitions from displaying the virtual object 404 at the first predetermined viewing point 426-1 in FIG. 4L to displaying the virtual object 404 at the third predetermined viewing point 426-3, as shown in FIG. 4N. For example, as shown in FIG. 4N, the electronic device 401 rotates the virtual object 404 in the pitch direction about the horizontal axis 495 in the three-dimensional environment 450. As similarly discussed above, the predetermined viewing point that the electronic device 401 transitions display of the virtual object 404 to is based on (e.g., opposite to in the field of view) the direction of rotation of the first portion of the head gesture. As illustrated in FIG. 4M, because the first portion of the head gesture corresponds to rotation of the viewpoint 418 downward in the pitch direction (represented by (1)), the electronic device 401 rotates the virtual object 404 upward (e.g., clockwise) about the horizontal axis 495, as represented by arrow 472N, relative to the viewpoint 418, corresponding to transitioning display of the virtual object 404 to the third predetermined viewing point 426-3, as shown in FIG. 4N. In some examples, as shown in FIG. 4N, when the electronic device 401 transitions display of the virtual object 404 from the first predetermined viewing point 426-1 to the third predetermined viewing point 426-3, the bottom view of the virtual object 404 is displayed in the center of the user's field of view and facing the viewpoint 418. Accordingly, as described above, rotating the virtual object 404 that is tilt locked or head locked in the three-dimensional environment 450 when transitioning display of the virtual object 404 between predetermined viewing points in response to detecting a respective gesture, such as a head gesture, enables the virtual object 404 to be inspected from alternate viewing angles (e.g., with 360 degrees of rotation in the pitch direction) without requiring the user to directly interact with the virtual object 404 and/or physically move in the physical environment surrounding the electronic device 401.

It should be understood that, while the examples illustrated in FIGS. 4L-4N and described above specifically discuss head gestures, in some examples, the electronic device 401 transitions display of the virtual object 404 between predetermined viewing points in the three-dimensional environment 450 in response to detecting rotation of the viewpoint 418 (e.g., as similarly discussed with reference to FIGS. 4A-4E). For example, rotation of the viewpoint 418 of the user in a first direction (e.g., upward) in the pitch direction, without rotation of the viewpoint 418 back down in a second direction that is opposite to the first direction, causes the electronic device 401 to transition from displaying the virtual object 404 at the first predetermined viewing point 426-1 to displaying the virtual object 404 at the second predetermined viewing point 426-2 (shown in FIG. 4M), which includes rotating the virtual object 404 about the horizontal axis 495 in the second direction (e.g., counterclockwise) relative to the viewpoint 418. However, in such an example, the electronic device 401 would also move the virtual object 404 in the three-dimensional environment 450 based on the rotation of the viewpoint to maintain the virtual object 404 at a fixed distance and/or orientation offset relative to the portion of the user (e.g., the user's torso if the virtual object 404 is tilt locked or the user's head if the virtual object 404 is head locked, as previously discussed herein).

In some examples, the treatments for rotating the virtual object 404 in the yaw direction (e.g., about the vertical axis 485) and rotating the virtual object 404 in the pitch direction (e.g., about the horizontal axis 495) may be provided in a single, continuous user experience based on the direction of the rotation of the viewpoint 418. For example, as discussed herein, while the virtual object 404 is displayed in the three-dimensional environment 450 in the tilt locked or head locked orientation, rotation of the viewpoint 418 (e.g., at least partially) in the yaw direction causes the electronic device 401 to rotate the virtual object 404 in the yaw direction relative to the viewpoint 418, and rotation of the viewpoint 418 (e.g., at least partially) in the pitch direction causes the electronic device 401 to rotate the virtual object 404 in the pitch direction relative to the viewpoint 418. In some examples, the rotation of the viewpoint 418 may alternatively be utilized to control other user interactions with the virtual object 404. For example, while the virtual object 404 is displayed in the three-dimensional environment 450, rotation of the viewpoint 418 (e.g., at least partially) in the yaw direction causes the electronic device 401 to rotate the virtual object 404 in the yaw direction relative to the viewpoint 418, and rotation of the viewpoint 418 in the pitch direction causes the electronic device 401 to scale the virtual object 404 in the three-dimensional environment 450 (e.g., increase a size of the virtual object 404 with upward head rotation and the decrease the size of the virtual object 404 with downward head rotation in the pitch direction).

Accordingly, as discussed above, the user may continuously rotate their viewpoint 418 (e.g., by moving the electronic device 401) with six degrees of freedom and the electronic device 401 may automatically rotate the virtual object 404 that is tilt locked or head locked in the three-dimensional environment 450 based on a direction of the rotation of the viewpoint 418. Thus, as described herein with reference to FIGS. 4A-4N, the disclosed method enables a user to, while a virtual object is displayed in a three-dimensional environment, to visually inspect the virtual object from a plurality of viewing angles without requiring the user to directly interact with and/or move in the three-dimensional environment to view the virtual object, as one advantage. Additionally, the disclosed method enables the virtual object to continuously be displayed in the three-dimensional environment without being obstructed by other user interface elements associated with the virtual object, which would otherwise hinder and/or distract from the user's ability to visually inspect the virtual object in the three-dimensional environment.

In some examples, the behaviors of the virtual object 404 described herein are associated with a particular mode of operation (e.g., a viewing mode or display mode) at the electronic device 401. For example, the electronic device 401 rotates the virtual object 404 in the three-dimensional environment 450 based on the rotation of the viewpoint of the user in any of the manners discussed above when a respective mode is active at the electronic device 401. In some examples, if the respective mode is not active at the electronic device 401 while displaying the virtual object 404, the display of the virtual object 404 may follow the standard tilt locked or head locked behaviors described previously with reference to FIGS. 3A-3D (e.g., the electronic device 401 forgoes rotating the virtual object 404 based on the rotation and/or movement of the viewpoint 418). In some examples, the respective mode may be selectively activated when the virtual object 404 is initially displayed in the three-dimensional environment 450, according to user preferences (e.g., based on the object type), in response to receiving a selection of an affordance/option associated with activating the respective mode from a settings menu, etc.

It should be understood that, while the virtual object 404 is described herein as being a virtual sculpture, in some examples, the virtual object 404 may be a three-dimensional representation (e.g., rendering, such as a model, scan, point cloud representation, etc.) of a real-world object that is present in the physical environment surrounding the electronic device 401. For example, the physical environment surrounding the electronic device 401 may include a table (e.g., similar or corresponding to table 106 in FIG. 1). Accordingly, in some examples, the virtual object 404 may be a virtual rendering of the table that is visible in the field of view of the user in the three-dimensional environment 450. In some such examples, the virtual object 404 may be associated with a respective application running on the electronic device 401 that is provided for the generating of the virtual object (e.g., the virtual rendering). For example, the virtual object 404 may be associated with a furniture assembly application that provides visual cues (e.g., step-by-step instructions, animations, video clips/images, etc.) for assembling the table in the physical environment surrounding the electronic device 401.

Additionally, it is understood that the examples shown and described herein are merely exemplary and that additional and/or alternative elements may be provided within the three-dimensional environment for interacting with the virtual objects and elements. It should be understood that the appearance, shape, form, and size of each of the various user interface elements and objects shown and described herein are exemplary and that alternative appearances, shapes, forms and/or sizes may be provided. For example, the virtual objects representative of application windows (e.g., application window 330) may be provided in an alternative shape than a rectangular shape, such as a circular shape, triangular shape, etc. In some examples, the various selectable affordances (e.g., first and second user interface objects 312/412 and 308/408) described herein may be selected verbally via user verbal commands (e.g., "select option" or "select virtual object" verbal command). Additionally or alternatively, in some examples, the various options, user interface elements, control elements, etc. described herein may be selected and/or manipulated via user input received via one or more separate input devices in communication with the electronic device(s). For example, selection input may be received via physical input devices, such as a mouse, trackpad, keyboard, etc. in communication with the electronic device(s).

Figure 5:
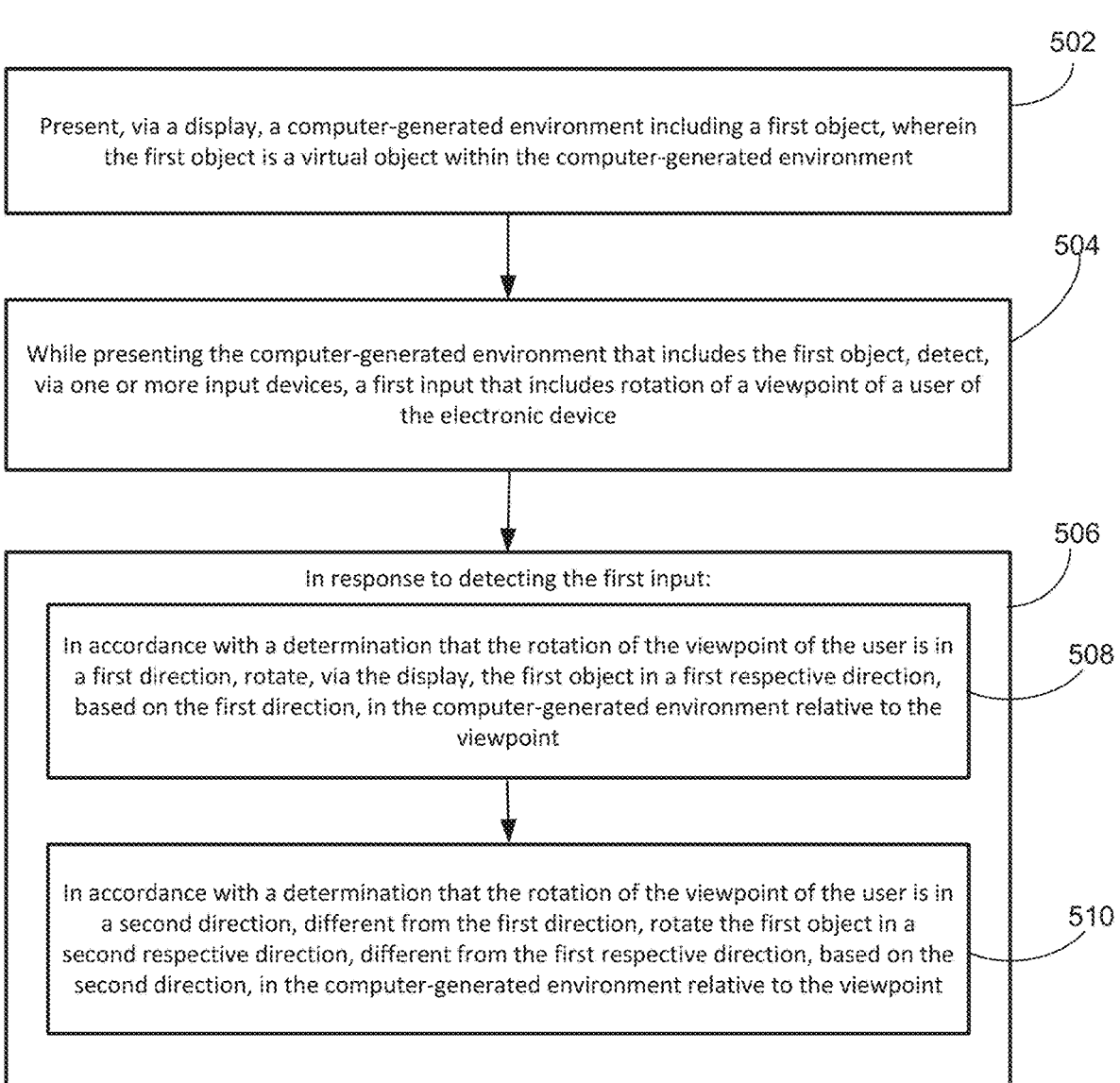
FIG. 5 illustrates a flow diagram illustrating an example process for rotating a virtual object in a three-dimensional environment based on a rotation of a viewpoint of a user according to some examples of the disclosure.

FIG. 5 illustrates a flow diagram illustrating an example process for rotating a virtual object in a three-dimensional environment based on a rotation of a viewpoint of a user according to some examples of the disclosure. In some examples, process 500 begins at an electronic device in communication with a display and one or more input devices. In some examples, the electronic device is optionally a head-mounted display similar or corresponding to device 201 of FIG. 2. As shown in FIG. 5, in some examples, at 502, the electronic device presents, via the display, a computer-generated environment including a first object, wherein the first object is a virtual object within the computer-generated environment. For example, the electronic device (e.g., electronic device 401 in FIG. 4A) displays a three-dimensional environment, such as three-dimensional environment 450, that includes a virtual object displayed in a tilt locked or head locked orientation in the three-dimensional environment, such as virtual object 404 in FIG. 4A.

In some examples, at 504, while presenting the computer-generated environment that includes the first object, the electronic device detects, via the one or more input devices, a first input that includes rotation of a viewpoint of a user of the electronic device. For example, the electronic device detects rotation of the viewpoint of the user leftward or rightward in the yaw direction relative to the three-dimensional environment, such as the rightward movement of the viewpoint 418 represented by arrow 471A in FIG. 4A. In some examples, at 506, in response to detecting the first input, at 508, in accordance with a determination that the rotation of the viewpoint of the user is in a first direction, the electronic device rotates, via the display, the first object in a first respective direction, based on the first direction, in the computer-generated environment relative to the viewpoint. For example, as shown in FIG. 4B, in response to detecting the rightward rotation of the viewpoint 418 in the yaw direction, the electronic device 401 rotates the virtual object 404 leftward (e.g., clockwise) in the yaw direction in the three-dimensional environment 450, which is opposite the direction of rotation of the viewpoint 418, relative to the viewpoint 418 (but the same direction about the axis 485 in FIG. 4B).

In some examples, at 510, in accordance with a determination that the rotation of the viewpoint of the user is in a second direction, different from the first direction (e.g., opposite to the first direction), the electronic device rotates the first object in a second respective direction, different from the first respective direction (e.g., opposite to the first respective direction), based on the second direction, in the computer-generated environment relative to the viewpoint. For example, as shown in FIG. 4D, in response to detecting leftward rotation of the viewpoint 418 in the yaw direction in FIG. 4C, the electronic device rotates the virtual object 404 rightward (e.g., counterclockwise) in the yaw direction in the three-dimensional environment 450, which is opposite the direction of rotation of the viewpoint 418, relative to the viewpoint 418 (but the same direction about the axis 485 in FIG. 4D).

It is understood that process 500 is an example and that more, fewer, or different operations can be performed in the same or in a different order. Additionally, the operations in process 500 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method comprising, at an electronic device in communication with a display and one or more input devices: presenting, via the display, a computer-generated environment including a first object, wherein the first object is a virtual object within the computer-generated environment; while presenting the computer-generated environment that includes the first object, detecting, via the one or more input devices, a first input that includes rotation of a viewpoint of a user of the electronic device; and in response to detecting the first input, in accordance with a determination that the rotation of the viewpoint of the user is in a first direction, rotating, via the display, the first object in a first respective direction, based on the first direction, in the computer-generated environment relative to the viewpoint, and in accordance with a determination that the rotation of the viewpoint of the user is in a second direction, different from the first direction, rotating the first object in a second respective direction, different from the first respective direction, based on the second direction, in the computer-generated environment relative to the viewpoint.

Additionally or alternatively, in some examples, the electronic device includes a head-mounted display. Additionally or alternatively, in some examples, the rotation of the viewpoint of the user corresponds to rotation of the head-mounted display. Additionally or alternatively, in some examples, rotating the first object in the first respective direction, based on the first direction, in the computer-generated environment corresponds to rotating the first object in the first respective direction that corresponds to the first direction. Additionally or alternatively, in some examples, rotating the first object in the second respective direction, based on the second direction, in the computer-generated environment corresponds to rotating the first object in the second respective direction that corresponds to the first direction. Additionally or alternatively, in some examples, rotating the first object in the first respective direction, based on the first direction, in the computer-generated environment includes, in accordance with a determination that the first respective direction is a clockwise direction, rotating the first object in a clockwise direction in the computer-generated environment relative to the viewpoint, and in accordance with a determination that the first respective direction is a counterclockwise direction, rotating the first object in a counterclockwise direction in the computer-generated environment relative to the viewpoint. Additionally or alternatively, in some examples, before detecting the first input, the first object is displayed at a respective location in the computer-generated environment relative to a head of the user according to a respective coordinate system. Additionally or alternatively, in some examples, before detecting the first input, the first object is displayed at a respective location in the computer-generated environment relative to a portion of a body of the user according to a spherical coordinate system.

Additionally or alternatively, in some examples, an amount of rotation of the first object in the computer-generated environment is correlated to an amount of rotation of the viewpoint of the user using a correlation ratio. Additionally or alternatively, in some examples, the correlation ratio is determined based on a speed of the rotation of the viewpoint of the user. Additionally or alternatively, in some examples, in accordance with a determination that the speed of the rotation of the viewpoint of the user is a first speed, the first object is rotated by a first amount in the computer-generated environment, and in accordance with a determination that the speed of the rotation of the viewpoint is a second speed, greater than the first speed, the first object is rotated by a second amount, greater than the first amount, in the computer-generated environment. Additionally or alternatively, in some examples, detecting the rotation of the viewpoint of the user includes detecting a head gesture that includes movement of a head of the user, and an amount of rotation of the first object in the computer-generated environment is a predetermined amount that is independent of an amount of rotation of the viewpoint of the user. Additionally or alternatively, in some examples, the predetermined amount of the rotation of the first object is a predetermined degree of axial rotation of the first object. Additionally or alternatively, in some examples, the first object is associated with a plurality of predetermined viewing points in the computer-generated environment. Additionally or alternatively, in some examples, before detecting the first input, the first object is displayed according to a first predetermined viewing point of the plurality of predetermined viewing points in the computer-generated environment relative to the viewpoint of the user, and in response to detecting the first input: in accordance with a determination that the rotation of the viewpoint of the user is in the first direction, the first object is displayed according to a second predetermined viewing point, different from the first predetermined viewing point, in the computer-generated environment relative to the viewpoint; and in accordance with a determination that the rotation of the viewpoint of the user is in the second direction, the first object is displayed according to a third predetermined viewing point, different from the first and the second predetermined viewing points, in the computer-generated environment relative to the viewpoint.

Additionally or alternatively, in some examples, the rotation of the viewpoint of the user is axial about a vertical axis through a head of the user. Additionally or alternatively, in some examples, the rotation of the first object in the computer-generated environment is axial about a vertical axis through the first object. Additionally or alternatively, in some examples, the rotation of the viewpoint of the user is axial about a horizontal axis through a head of the user. Additionally or alternatively, in some examples, the rotation of the first object in the computer-generated environment is axial about a horizontal axis through the first object. Additionally or alternatively, in some examples, the computer-generated environment further includes a second object, wherein the second object is displayed at a respective location in the computer-generated environment relative to the computer-generated environment. Additionally or alternatively, in some examples, the method further comprises, in response to detecting the first input, forgoing rotating the second object in the computer-generated environment based on the rotation of the viewpoint of the user. Additionally or alternatively, in some examples, the method further comprises: while presenting the computer-generated environment that includes the first object, detecting, via the one or more input devices, a second input that includes translation of the viewpoint of the user relative to the first object in the computer-generated environment; and in response to detecting the second input, moving, via the display, the first object in the computer-generated environment based on the translation of the viewpoint, and forgoing rotating the first object in the computer-generated environment.

Additionally or alternatively, in some examples, rotating the first object in the computer-generated environment based on the rotation of the viewpoint in response to detecting the first input is in accordance with a determination that one or more criteria are satisfied, including a criterion that is satisfied when the rotation of the viewpoint does not include translation of the viewpoint beyond a threshold movement relative to the computer-generated environment. Additionally or alternatively, in some examples, rotating the first object in the computer-generated environment based on the rotation of the viewpoint in response to detecting the first input is in accordance with a determination that one or more criteria are satisfied, including a criterion that is satisfied when the rotation of the viewpoint exceeds a threshold rotation relative to the computer-generated environment. Additionally or alternatively, in some examples, at least a portion of the first object is a three-dimensional representation of a physical object in a physical environment that is visible in a field of view of the user.

Some examples of the disclosure are directed to an electronic device comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising one or more processors, memory, and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:

at an electronic device in communication with a display and one or more input devices:

presenting, via the display, a three-dimensional environment including a first object, wherein the first object is a virtual object that is displayed in a first orientation within the three-dimensional environment, and wherein the first orientation includes the first object being locked to a first portion of a body of a user of the electronic device;

while presenting the three-dimensional environment that includes the first object, detecting, via the one or more input devices, a first input that includes rotation of a viewpoint of a user of the electronic device; and in response to detecting the first input:

in accordance with a determination that the rotation of the viewpoint of the user is in a first direction, rotating, via the display, the first object axially in a first respective direction, based on the first direction, about a first axis in the three-dimensional environment relative to the viewpoint, wherein the first axis is a vertical axis through the first object; and in accordance with a determination that the rotation of the viewpoint of the user is in a second direction, different from the first direction, rotating the first object axially in a second respective direction, different from the first respective direction, based on the second direction, about the first axis in the three-dimensional environment relative to the viewpoint; and after rotating the first object axially in response to the first input, displaying, via the display, the first object in the three-dimensional environment in a second orientation, different from the first orientation, wherein the second orientation includes the first object being locked to a second portion, different from the first portion, of the body of the user.

2. The method of claim 1, wherein rotating the first object in the first respective direction, based on the first direction, in the three-dimensional environment includes:

in accordance with a determination that the first respective direction is a clockwise direction, rotating the first object in a clockwise direction in the three-dimensional environment relative to the viewpoint; and in accordance with a determination that the first respective direction is a counterclockwise direction, rotating the first object in a counterclockwise direction in the three-dimensional environment relative to the viewpoint.

3. The method of claim 1, wherein:

an amount of rotation of the first object in the three-dimensional environment is correlated to an amount of rotation of the viewpoint of the user using a correlation ratio;

the correlation ratio is determined based on a speed of the rotation of the viewpoint of the user;

in accordance with a determination that the speed of the rotation of the viewpoint of the user is a first speed, the first object is rotated by a first amount in the three-dimensional environment; and in accordance with a determination that the speed of the rotation of the viewpoint is a second speed, greater than the first speed, the first object is rotated by a second amount, greater than the first amount, in the three-dimensional environment.

4. The method of claim 1, wherein:

detecting the rotation of the viewpoint of the user includes detecting a head gesture that includes movement of a head of the user; and an amount of rotation of the first object in the three-dimensional environment is a predetermined amount that is independent of an amount of rotation of the viewpoint of the user.

5. The method of claim 1, wherein:

the first object is associated with a plurality of predetermined viewing points in the three-dimensional environment;

before detecting the first input, the first object is displayed according to a first predetermined viewing point of the plurality of predetermined viewing points in the three-dimensional environment relative to the viewpoint of the user; and in response to detecting the first input:

in accordance with a determination that the rotation of the viewpoint of the user is in the first direction, the first object is displayed according to a second predetermined viewing point, different from the first predetermined viewing point, in the three-dimensional environment relative to the viewpoint; and in accordance with a determination that the rotation of the viewpoint of the user is in the second direction, the first object is displayed according to a third predetermined viewing point, different from the first and the second predetermined viewing points, in the three-dimensional environment relative to the viewpoint.

6. The method of claim 1, further comprising:

while presenting the three-dimensional environment that includes the first object in the first orientation, detecting, via the one or more input devices, a second input that includes translation of the viewpoint of the user relative to the first object in the three-dimensional environment; and in response to detecting the second input:

moving, via the display, the first object in the three-dimensional environment based on the translation of the viewpoint; and forgoing rotating the first object in the three-dimensional environment.

7. The method of claim 1, wherein rotating the first object in the three-dimensional environment based on the rotation of the viewpoint in response to detecting the first input is in accordance with a determination that one or more criteria are satisfied, including a criterion that is satisfied when the rotation of the viewpoint does not include translation of the viewpoint beyond a threshold movement relative to the three-dimensional environment.

8. The method of claim 1, wherein rotating the first object in the three-dimensional environment based on the rotation of the viewpoint in response to detecting the first input is in accordance with a determination that one or more criteria are satisfied, including a criterion that is satisfied when the rotation of the viewpoint exceeds a threshold rotation relative to the three-dimensional environment.

9. An electronic device comprising:

one or more processors;

memory; and one or more programs stored in the memory and configured to be executed by the one or more processors, the one or more programs including instructions for performing a method comprising:

presenting, via a display, a three-dimensional environment including a first object, wherein the first object is a virtual object that is displayed in a first orientation within the three-dimensional environment, and wherein the first orientation includes the first object being locked to a first portion of a body of a user of the electronic device;

while presenting the three-dimensional environment that includes the first object, detecting, via one or more input devices, a first input that includes rotation of a viewpoint of a user of the electronic device; and in response to detecting the first input:

in accordance with a determination that the rotation of the viewpoint of the user is in a first direction, rotating, via the display, the first object axially in a first respective direction, based on the first direction, about a first axis in the three-dimensional environment relative to the viewpoint, wherein the first axis is a vertical axis through the first object; and in accordance with a determination that the rotation of the viewpoint of the user is in a second direction, different from the first direction, rotating the first object axially in a second respective direction, different from the first respective direction, based on the second direction, about the first axis in the three-dimensional environment relative to the viewpoint; and after rotating the first object axially in response to the first input, displaying, via the display, the first object in the three-dimensional environment in a second orientation, different from the first orientation, wherein the second orientation includes the first object being locked to a second portion, different from the first portion, of the body of the user.

10. The electronic device of claim 9, wherein rotating the first object in the first respective direction, based on the first direction, in the three-dimensional environment includes:

in accordance with a determination that the first respective direction is a clockwise direction, rotating the first object in a clockwise direction in the three-dimensional environment relative to the viewpoint; and in accordance with a determination that the first respective direction is a counterclockwise direction, rotating the first object in a counterclockwise direction in the three-dimensional environment relative to the viewpoint.

11. The electronic device of claim 9, wherein:

an amount of rotation of the first object in the three-dimensional environment is correlated to an amount of rotation of the viewpoint of the user using a correlation ratio;

the correlation ratio is determined based on a speed of the rotation of the viewpoint of the user;

in accordance with a determination that the speed of the rotation of the viewpoint of the user is a first speed, the first object is rotated by a first amount in the three-dimensional environment; and in accordance with a determination that the speed of the rotation of the viewpoint is a second speed, greater than the first speed, the first object is rotated by a second amount, greater than the first amount, in the three-dimensional environment.

12. The electronic device of claim 9, wherein:

detecting the rotation of the viewpoint of the user includes detecting a head gesture that includes movement of a head of the user; and an amount of rotation of the first object in the three-dimensional environment is a predetermined amount that is independent of an amount of rotation of the viewpoint of the user.

13. The electronic device of claim 9, wherein:

the first object is associated with a plurality of predetermined viewing points in the three-dimensional environment;

before detecting the first input, the first object is displayed according to a first predetermined viewing point of the plurality of predetermined viewing points in the three-dimensional environment relative to the viewpoint of the user; and in response to detecting the first input:

in accordance with a determination that the rotation of the viewpoint of the user is in the first direction, the first object is displayed according to a second predetermined viewing point, different from the first predetermined viewing point, in the three-dimensional environment relative to the viewpoint; and in accordance with a determination that the rotation of the viewpoint of the user is in the second direction, the first object is displayed according to a third predetermined viewing point, different from the first and the second predetermined viewing points, in the three-dimensional environment relative to the viewpoint.

14. The electronic device of claim 9, wherein the method further comprises:

while presenting the three-dimensional environment that includes the first object in the first orientation, detecting, via the one or more input devices, a second input that includes translation of the viewpoint of the user relative to the first object in the three-dimensional environment; and in response to detecting the second input:

moving, via the display, the first object in the three-dimensional environment based on the translation of the viewpoint; and forgoing rotating the first object in the three-dimensional environment.

15. The electronic device of claim 9, wherein rotating the first object in the three-dimensional environment based on the rotation of the viewpoint in response to detecting the first input is in accordance with a determination that one or more criteria are satisfied, including a criterion that is satisfied when the rotation of the viewpoint does not include translation of the viewpoint beyond a threshold movement relative to the three-dimensional environment.

16. The electronic device of claim 9, wherein rotating the first object in the three-dimensional environment based on the rotation of the viewpoint in response to detecting the first input is in accordance with a determination that one or more criteria are satisfied, including a criterion that is satisfied when the rotation of the viewpoint exceeds a threshold rotation relative to the three-dimensional environment.

17. A non-transitory computer readable storage medium storing one or more programs, the one or more programs comprising instructions, which when executed by one or more processors of an electronic device, cause the electronic device to perform a method comprising:

presenting, via a display, a three-dimensional environment including a first object, wherein the first object is a virtual object that is displayed in a first orientation within the three-dimensional environment, and wherein the first orientation includes the first object being locked to a first portion of a body of a user of the electronic device;

while presenting the three-dimensional environment that includes the first object, detecting, via one or more input devices, a first input that includes rotation of a viewpoint of a user of the electronic device; and in response to detecting the first input:

in accordance with a determination that the rotation of the viewpoint of the user is in a first direction, rotating, via the display, the first object axially in a first respective direction, based on the first direction, about a first axis in the three-dimensional environment relative to the viewpoint, wherein the first axis is a vertical axis through the first object; and in accordance with a determination that the rotation of the viewpoint of the user is in a second direction, different from the first direction, rotating the first object axially in a second respective direction, different from the first respective direction, based on the second direction, about the first axis in the three-dimensional environment relative to the viewpoint; and after rotating the first object axially in response to the first input, displaying, via the display, the first object in the three-dimensional environment in a second orientation, different from the first orientation, wherein the second orientation includes the first object being locked to a second portion, different from the first portion, of the body of the user.

18. The non-transitory computer readable storage medium of claim 17, wherein rotating the first object in the first respective direction, based on the first direction, in the three-dimensional environment includes:

in accordance with a determination that the first respective direction is a clockwise direction, rotating the first object in a clockwise direction in the three-dimensional environment relative to the viewpoint; and in accordance with a determination that the first respective direction is a counterclockwise direction, rotating the first object in a counterclockwise direction in the three-dimensional environment relative to the viewpoint.

19. The non-transitory computer readable storage medium of claim 17, wherein:

an amount of rotation of the first object in the three-dimensional environment is correlated to an amount of rotation of the viewpoint of the user using a correlation ratio;

the correlation ratio is determined based on a speed of the rotation of the viewpoint of the user;

in accordance with a determination that the speed of the rotation of the viewpoint of the user is a first speed, the first object is rotated by a first amount in the three-dimensional environment; and in accordance with a determination that the speed of the rotation of the viewpoint is a second speed, greater than the first speed, the first object is rotated by a second amount, greater than the first amount, in the three-dimensional environment.

20. The non-transitory computer readable storage medium of claim 17, wherein:

detecting the rotation of the viewpoint of the user includes detecting a head gesture that includes movement of a head of the user; and an amount of rotation of the first object in the three-dimensional environment is a predetermined amount that is independent of an amount of rotation of the viewpoint of the user.

21. The non-transitory computer readable storage medium of claim 17, wherein:

the first object is associated with a plurality of predetermined viewing points in the three-dimensional environment;

before detecting the first input, the first object is displayed according to a first predetermined viewing point of the plurality of predetermined viewing points in the three-dimensional environment relative to the viewpoint of the user; and in response to detecting the first input:

in accordance with a determination that the rotation of the viewpoint of the user is in the first direction, the first object is displayed according to a second predetermined viewing point, different from the first predetermined viewing point, in the three-dimensional environment relative to the viewpoint; and in accordance with a determination that the rotation of the viewpoint of the user is in the second direction, the first object is displayed according to a third predetermined viewing point, different from the first and the second predetermined viewing points, in the three-dimensional environment relative to the viewpoint.

22. The non-transitory computer readable storage medium of claim 17, wherein the method further comprises:

while presenting the three-dimensional environment that includes the first object in the first orientation, detecting, via the one or more input devices, a second input that includes translation of the viewpoint of the user relative to the first object in the three-dimensional environment; and in response to detecting the second input:

moving, via the display, the first object in the three-dimensional environment based on the translation of the viewpoint; and forgoing rotating the first object in the three-dimensional environment.

23. The non-transitory computer readable storage medium of claim 17, wherein rotating the first object in the three-dimensional environment based on the rotation of the viewpoint in response to detecting the first input is in accordance with a determination that one or more criteria are satisfied, including a criterion that is satisfied when the rotation of the viewpoint does not include translation of the viewpoint beyond a threshold movement relative to the three-dimensional environment.

24. The non-transitory computer readable storage medium of claim 17, wherein rotating the first object in the three-dimensional environment based on the rotation of the viewpoint in response to detecting the first input is in accordance with a determination that one or more criteria are satisfied, including a criterion that is satisfied when the rotation of the viewpoint exceeds a threshold rotation relative to the three-dimensional environment.

* * * * *